US011942672B2

(12) United States Patent
Meng

(10) Patent No.: US 11,942,672 B2
(45) **Date of Patent: *Mar. 26, 2024**

(54) CAVITY HIGH-Q TRIPLE-MODE DIELECTRIC RESONANCE STRUCTURE AND FILTER WITH RESONANCE STRUCTURE

(71) Applicant: HONGKONG FINGU DEVELOPMENT COMPANY LIMITED, Hong Kong (CN)

(72) Inventor: Qingnan Meng, Hubei (CN)

(73) Assignee: HONGKONG FINGU DEVELOPMENT COMPANY LIMITED, Hong Kong (CN)

( * ) Notice: Subject to any disclaimer, the term of this patent is extended or adjusted under 35 U.S.C. 154(b) by 388 days.

This patent is subject to a terminal disclaimer.

(21) Appl. No.: 17/267,507

(22) PCT Filed: Dec. 29, 2018

(86) PCT No.: PCT/CN2018/125162

§ 371 (c)(1),
(2) Date: Feb. 10, 2021

(87) PCT Pub. No.: WO2020/048063

PCT Pub. Date: Mar. 12, 2020

(65) Prior Publication Data

US 2022/0352612 A1 Nov. 3, 2022

(30) Foreign Application Priority Data

Sep. 4, 2018 (CN) ........................ 201811026911.6

(51) Int. Cl.
*H01P 1/20* (2006.01)
*H01P 1/208* (2006.01)
(Continued)

(52) U.S. Cl.
CPC .............. *H01P 1/2086* (2013.01); *H01P 7/06* (2013.01); *H01P 7/105* (2013.01)

(58) Field of Classification Search
CPC .. H01P 1/2086; H01P 1/20; H01P 7/06; H01P 7/105; H01P 1/2002; H01P 1/2084; H01P 1/16; H01P 1/207
See application file for complete search history.

(56) References Cited

U.S. PATENT DOCUMENTS 10,109,906 B2 * 10/2018 Park .......................... H01P 7/04
10,283,830 B2 * 5/2019 Hendry .................. H01P 1/045
(Continued)

FOREIGN PATENT DOCUMENTS

CN 1269914 A 10/2000
CN 1472842 A 2/2004
(Continued)

OTHER PUBLICATIONS

Shen, Jianming, etc; <Study of ultra small dielectric filter for 5G-WiFi>; 《Journal of Mechanical & Electrical Engineering》;Jul. 31, 2017;p. 786-789; vol. 34 No. 7.
(Continued)

*Primary Examiner* — Vibol Tan
(74) *Attorney, Agent, or Firm* — Samson G. Yu

(57) ABSTRACT

Some embodiments of the present disclosure provide a cavity high-Q triple-mode dielectric resonance structure and a filter with the resonance structure. The resonance structure includes a cavity and a cover plate, wherein an arrangement inside the cavity includes a cube-like dielectric resonance block and a dielectric support frame; the cube-like dielectric resonance block and the dielectric support frame form a triple-mode dielectric resonance rod; between the triple-mode dielectric resonance rod and an inner wall of the cavity is air; one or any end of the cube-like dielectric resonance
(Continued)

block is connected with the dielectric support frame respectively; the dielectric support frame is connected with the inner wall of the cavity; and the cube-like dielectric resonance block forms a triple-mode resonance in three directions of axes X, Y and Z of the cavity.

40 Claims, 8 Drawing Sheets

(51) Int. Cl.
*H01P 7/06* (2006.01)
*H01P 7/10* (2006.01)

(56) References Cited

U.S. PATENT DOCUMENTS

| | | | | |
|---|---|---|---|---|
| 10,320,050 | B2 * | 6/2019 | Park | H01P 1/2082 |
| 11,239,540 | B2 * | 2/2022 | Meng | H01P 7/105 |
| 11,258,150 | B2 * | 2/2022 | Meng | H01P 1/2086 |
| 11,688,920 | B2 * | 6/2023 | Meng | H01P 7/105 333/219.1 |
| 2017/0279180 | A1 | 9/2017 | Park | |
| 2018/0212295 | A1 | 7/2018 | Hendry | |
| 2021/0320391 | A1 * | 10/2021 | Meng | H01P 7/06 |

FOREIGN PATENT DOCUMENTS

| | | | |
|---|---|---|---|
| CN | 1531136 | A | 9/2004 |
| CN | 102324602 | A | 1/2012 |
| CN | 102544649 | A | 7/2012 |
| CN | 108336458 | A | 7/2018 |
| JP | H08186412 | A | 7/1996 |

OTHER PUBLICATIONS

Corresponding EP search results dated May 4, 2022.
Bakr Mustafa S et al: "Miniature Triple-Mode Dielectric Resonator Filters", 2018 IEEE/MTT-S Internation Microwave Symposium—IMS, IEEE; Jun. 10, 2018; pp. 1249-1252, XP033387893.
Chua L H et al: "Analysis of dielectric loaded cubical cavity for triple-mode filter design", IEE Proceedings: Microwaves, Antennas and Propagation, IEE Stevenage, Herts, GB; vol. 151, No. 1; Jan. 14, 2004; pp. 61-66. XP006021299.

* cited by examiner

Solved Modes

Export

| | Eigenmode | Frequency (GHz) | |
|---|---|---|---|
| | Mode 1 | 1.88160 +j 5.30125e-005 | 17746.8 |
| | Mode 2 | 1.88193 +j 5.29487e-005 | 17771.3 |
| | Mode 3 | 1.88256 +j 5.28831e-005 | 17797.2 |
| | Mode 4 | 1.90531 +j 8.92146e-005 | 10678.2 |

Solved Modes                Export

| | Eigenmode | Frequency (GHz) | |
|---|---|---|---|
| | Mode 1 | 1.88520 +j 5.34201e-005 | 17645.1 |
| | Mode 2 | 1.88527 +j 5.40126e-005 | 17452.1 |
| | Mode 3 | 1.88534 +j 5.30473e-005 | 17770.4 |
| | Mode 4 | 1.90527 +j 8.92576e-005 | 10672.9 |

Solved Modes

Export

| | Eigenmode | Frequency (GHz) | |
|---|---|---|---|
| | Mode 1 | 1.87950 +j 5.42008e-005 | 17338.3 |
| | Mode 2 | 1.88111 +j 5.52704e-005 | 17017.3 |
| | Mode 3 | 1.88120 +j 5.52554e-005 | 17022.8 |
| | Mode 4 | 1.90185 +j 8.97315e-005 | 10597.5 |

Solved Modes

Export

| | Eigenmode | Frequency (GHz) | |
|---|---|---|---|
| | Mode 1 | 1.88167 +j 5.33479e-005 | 17635.9 |
| | Mode 2 | 1.88190 +j 5.33107e-005 | 17650.3 |
| | Mode 3 | 1.88232 +j 5.32579e-005 | 17671.7 |
| | Mode 4 | 1.90614 +j 8.90485e-005 | 10702.8 |

CAVITY HIGH-Q TRIPLE-MODE DIELECTRIC RESONANCE STRUCTURE AND FILTER WITH RESONANCE STRUCTURE

CROSS-REFERENCE TO RELATED APPLICATIONS

The present disclosure is a national stage application of International Patent Application No. PCT/CN2018/125162, which is filed on Dec. 29, 2018, and claims priority to Chinese Patent Application No. 201811026911.6, filed on Sep. 4, 2018 and entitled "Cavity High-Q Triple-Mode Dielectric Resonance Structure and Filter with Resonance Structure", the contents of which are hereby incorporated by reference in its entirety.

TECHNICAL FIELD

The present disclosure relates to base station filters, antenna feeder filters, combiners, anti-interference filters and the like used in a field of wireless communication, in particular to a high-Q triple-mode dielectric resonance structure and a filter with the high-Q triple-mode dielectric resonance structure. The filters include band-pass filters, band-stop filters, high-pass filters, and low-pass filters.

BACKGROUND

With a rapid development of fourth-generation mobile communications to fifth-generation mobile communications, requirements for miniaturization and high performances of communication equipment are becoming higher and higher. As metal cavity bodies of traditional filters have relatively large volume and traditional filters have general performances, the traditional filters are gradually replaced by single-mode dielectric filters. The single-mode dielectric filters mainly include TE01-mode dielectric filters and TM-mode dielectric filters; and the TE01-mode dielectric filters and the TM-Mode dielectric filters generally use a single-mode dielectric resonance manner. Although the single-mode dielectric resonance manner can increase a certain Q-value, the TE01-mode dielectric filters and the TM-Mode dielectric filters have disadvantages of high manufacturing cost and large volume.

In order to solve technical problems of high cost and large volume of the single-mode dielectric filters, triple-mode dielectric filters came into being. In the art known to inventors, the triple-mode dielectric filters are generally divided into TE triple-mode filters and TM triple-mode filters. The TE triple-mode filter has characteristics of complex coupling mode, large volume and high Q-value; and the TM triple-mode filter has characteristics of simple coupling mode, small volume and low Q-value. For the TE triple-mode filter and TM triple-mode filter having a same frequency band, weight, cost and volume of the TM triple-mode filter are much smaller than those of the TE triple-mode filter. Therefore, in the art known to inventors, the TE triple-mode filters are generally used to design narrow-band filters, and other types of filters generally use the TM triple-mode filters. As silver is baked on a dielectric resonance block of the TM triple-mode filter, a glassy substance is formed between a silver layer and a surface of the dielectric resonance block after the silver is baked, which causes an actual electric conductivity to be greatly reduced, and thus, an actual Q-value is lower, and an application range of the TM triple-mode filter is further limited. Therefore, how to obtain a high-Q TM triple-mode filter with small volume is a new direction for filter research and development.

A TM triple-mode filter known to inventors is generally of a structure of arranging a cubic/cube-like/spherical dielectric resonance block in a cubic/cube-like/spherical resonance cavity. The dielectric resonance block is supported by a dielectric base; and a ratio of a single side dimension of the resonance cavity to a single side dimension of the dielectric resonance block is generally greater than 1.6. When a volume of the resonance cavity remains unchanged and the dielectric resonance block slightly becomes large, or the volume of the resonance cavity slightly becomes small and the dielectric resonance block remains unchanged, or the volume of the resonance cavity slightly becomes small and the dielectric resonance block slightly becomes large, it can be seen through a comparison of data provided in table 1 that with an increase of the ratio of the single side dimension of the resonance cavity to the single side dimension of the dielectric resonance block, a Q-value of a base mode increases, a Q-value of a higher-order mode decreases, and a dimension of the dielectric resonance block decreases; when a dimension of the cavity constantly increases and is approximate to the ¾ wavelength dimension of the cavity, as the dimension of the dielectric resonance block continuously decreases, the Q-value of the base mode also decreases, and a frequency of the higher-order mode is sometimes far from and sometimes approximate to a frequency of the base mode with the increase of the ratio.

Cavity volumes of resonance cavities corresponding to different ratios are also different, and can be selected according to actual needs. For cavities of different dimensions and corresponding cubic-like resonators within a ratio range of table 1, when requirements for filter performances are very high, a single cavity with a ratio of more than 1.6 can be selected. Therefore, when the ratio of the single side dimension of the resonance cavity to the single side dimension of the dielectric resonance block is greater than 1.6, a value is directly proportional to a distance between the resonance cavity and the dielectric resonance block, which has disadvantages that a volume of the filter is excessively large.

TABLE 1

| side length of single cavity mm | Side length of dielectric resonance block | Q-value | ratio(side length of single cavity/side length of resonance block) | Higher-order frequency | Dielectric constant and frequency |
|---|---|---|---|---|---|
| 48 | 23.4 | 30562 | 2.05 | 2327.00 | ER = 35, F:1880 |
| 46 | 23.54 | 28770 | 1.95 | 2315.00 | ER = 35, F:1880 |
| 44 | 23.75 | 26683 | 1.85 | 2295.00 | ER = 35, F:1880 |

TABLE 1-continued

| side length of single cavity mm | Side length of dielectric resonance block | Q-value | ratio(side length of single cavity/side length of resonance block) | Higher-order frequency | Dielectric constant and frequency |
|---|---|---|---|---|---|
| 42 | 24.04 | 24308 | 1.75 | 2264.00 | ER = 35, F:1880 |
| 40 | 24.4 | 21686 | 1.64 | 2224.00 | ER = 35, F:1880 |
| 38 | 24.9 | 18783 | 1.53 | 2172.00 | ER = 35, F:1880 |
| 36 | 25.7 | 15496 | 1.40 | 2081.00 | ER = 35, F:1880 |

SUMMARY

In view of the above-mentioned defects in the art known to inventors, some embodiments of the present disclosure is to provide a high-Q triple-mode dielectric resonance structure and a filter with the resonance structure; and the high-Q triple-mode dielectric resonance structure reduces an overall insertion loss of the filter so as to meet requirements of a cavity filter for relatively small plug-ins and a relatively small volume.

Some embodiments of the present disclosure disclose a cavity high-Q triple-mode dielectric resonance structure applied to the filter. The triple-mode dielectric resonance structure includes a cavity and a cover plate, wherein a dielectric resonance block and a dielectric support frame are arranged inside the cavity; the dielectric resonance block is of a cube-like solid structure; the dielectric support frame is respectively connected with the dielectric resonance block and an inner wall of the cavity; the dielectric resonance block and the dielectric support frame form a triple-mode dielectric resonance rod; a dielectric constant of the dielectric support frame is less than a dielectric constant of the dielectric resonance block; a ratio K of a size of single side of the inner wall of the cavity to a size of the corresponding single side of the dielectric resonance block is as follows: when K is greater than or equal to a conversion point 1 and is less than or equal to a conversion point 2, a Q-value of a higher-order mode adjacent to a base mode, of the triple-mode dielectric resonance structure is converted into the Q-value of the base mode of the triple-mode dielectric resonance structure, the resonance frequency of the base mode after conversion is equal to the resonance frequency of the base mode before conversion, the Q-value of the base mode after conversion is greater than the Q-value of the base mode before conversion, the resonance frequency of the higher-order mode adjacent to the base mode after conversion is equal to the resonance frequency of the higher-order mode adjacent to the base mode before conversion, and the Q-value of the higher-order mode adjacent to the base mode after conversion is less than the Q-value of the higher-order mode adjacent to the base mode before conversion; the triple-mode dielectric resonance structure is internally provided with a coupling structure for changing orthogonal properties of electromagnetic field of a degenerate triple-mode in the cavity; and the triple-mode dielectric resonance structure is internally provided with a frequency tuning device for changing tuning frequency of the degenerate triple-mode in the cavity.

In some embodiments of the present disclosure, a value of the conversion point 1 and a value of the conversion point 2 both vary according to different resonance frequencies of the base mode of the dielectric resonance block, a dielectric constant of the dielectric resonance block, and a dielectric constant of the support frame.

In some embodiments of the present disclosure, when the resonance frequency of the base mode of the dielectric resonance block after conversion remains unchanged, a Q-value of the triple-mode dielectric resonance structure is related to the ratio K, the dielectric constant of the dielectric resonance block and the size of the dielectric resonance block.

In some embodiments of the present disclosure, when the ratio K increases from 1.0 to a maximum, the ratio K has triple Q-value conversion points in a variation range; and each Q-value conversion point enables the Q-value of the base mode and the Q-value of the higher-order mode adjacent to the base mode to be converted; and when the Q-value of the higher-order mode adjacent to the base mode is converted into the Q-value of the base mode, the Q-value of the base mode is higher than the Q-value of the base mode before conversion.

In some embodiments of the present disclosure, in four regions formed by a starting point, an ending point and triple Q-value conversion points of the ratio K, the Q-value of the base mode and the Q-value of the higher-order mode adjacent to the base mode change gradually vary with a variation of a size of a cavity body and a size of the dielectric resonance block, and requirements for applications of different regions in the filter are different.

In some embodiments of the present disclosure, the value of the conversion point 1 is greater than or equal to 1.03 and is less than or equal to 1.25; the value of the conversion point 2 is greater than or equal to 1.03 and is less than or equal to 1.25; and the value of the conversion point 1 is less than the value of the conversion point 2.

In some embodiments of the present disclosure, a coupling structure is disposed on the dielectric resonance block; and the coupling structure includes at least two structures which include at least one type of holes, grooves, cut corners, and chamfers which are not in parallel arrangement.

In some embodiments of the present disclosure, the grooves or the cut corners or the chamfers are disposed on edges of the dielectric resonance block.

In some embodiments of the present disclosure, the holes or the grooves are disposed on the end surfaces of the dielectric resonance block, and the center lines of the holes or the grooves are parallel to the edges perpendicular to the end surfaces with the holes or the grooves on the dielectric resonance block.

In some embodiments of the present disclosure, the coupling structure is disposed on the cavity; and the coupling structure includes at least two chamfers or bosses or chamfers and bosses not in parallel arrangement at the inner corners of the cavity, or tap wires/sheets disposed in the cavity and not in contact with the dielectric resonance block, or the coupling structure includes at least two chamfers or bosses or chamfers and bosses not in parallel arrangement at the inner corners of the cavity, and tap wires/sheets disposed in the cavity and not in contact with the dielectric resonance block.

In some embodiments of the present disclosure, the frequency tuning device includes at least one type of a tuning screw/disk disposed on the cavity, a thin film disposed on the surface of a dielectric resonance block, a thin film disposed on the inner wall of the cavity and a thin film disposed on the inner wall of the cover plate.

In some embodiments of the present disclosure, at least one end surface of the dielectric resonance block is disposed at least one dielectric support frame.

Some embodiments of the present disclosure also disclose a filter including the high-Q triple-mode dielectric resonance structure. The filter includes a cavity body, a cover plate and an input-output structure, wherein at least one high-Q triple-mode dielectric resonance structure is disposed in the cavity body.

In some embodiments of the present disclosure, the high-Q triple-mode dielectric resonance structure, a single-mode resonance structure, a two-mode resonance structure, and a triple-mode resonance structure are combined in different forms to form filters of different volumes; a coupling between any two resonance cavities formed by the arrangement and combination of the high-Q triple-mode dielectric resonance structure, a single-mode resonance cavity, a two-mode resonance cavity, and a triple-mode resonance cavity is only realized through a window size between the two resonance cavities under the condition that two resonance rods in the two resonance cavities are parallel; the window size is determined according to the coupling quantity; and the filters have functional characteristics that the filters include but are not limited to band pass filters, band stop filters, high pass filters, and low pass filters, and filters form duplexers, multiplexers and combiners.

In some embodiments of the present disclosure, under a condition that the resonance frequency of the cavity high-Q triple-mode dielectric resonance structure remains unchanged, the Q-value of the triple-mode dielectric resonance structure is related to a ratio K of a side length of the inner wall of the cavity body to a side length of the dielectric resonance block, a dielectric constant of the dielectric resonance block, and a size variation range of a dielectric block; and a range of the ratio K is related to different resonance frequencies, and the dielectric constants of the dielectric resonance rod and the support frame.

According to the above embodiment, when the ratio K of the side length size of the inner wall of the cavity to the size of the dielectric resonance block in the cavity high-Q triple-mode dielectric resonance structure increases from 1.0 to the maximum in a variation range, the ratio K has three conversion points in the variation range; each conversion point enables the Q-value of the resonance frequency of the base mode and the Q-value of the resonance frequency of the adjacent higher-order mode to be converted; and when the Q-value of the adjacent higher-order mode is converted into the Q-value of the base mode, the Q-value of the base mode is higher than the Q-value of the base mode before conversion.

In some embodiments, in the four regions formed by a starting point, a ending point and the three Q-value conversion points of the ratio K, the Q-value of the base mode and the Q-value of the adjacent higher-order mode vary gradually with the variation of the size of the cavity body and the size of the dielectric resonance block; and requirements for applications of different regions in the filter are different.

In some embodiments, the dielectric resonance block of the present disclosure is of a cube-like solid structure, wherein definition of a cube-like shape is as follows: the dielectric resonance block is a cuboid or a cube; when the dielectric resonance block has equal sizes in three directions of axes X, Y and Z, a degenerate triple-mode is formed and is coupled with other single cavities to form a band-pass filter; when the dielectric resonance block has slightly unequal sizes in three directions of axes X, Y and Z, an orthogonal-like triple-mode resonance is formed; if the orthogonal-like triple-mode is still coupled with other cavities to form the band-pass filter, sizes are all acceptable; if the orthogonal-like triple-mode is not coupled with other cavities to form the band-pass filter, the sizes are unacceptable; and when the differences of the sizes of the dielectric resonance block in three directions of axes X, Y and Z are greatly different, the degenerate triple-mode or the orthogonal-like triple-mode is not formed, but three modes with different frequencies are formed, thus, the three modes with different frequencies are not coupled with other cavities to form the band-pass filter, and the sizes are not acceptable.

In some embodiments, the cavity high-Q triple-mode dielectric resonance structure is internally provided with at least two coupling devices which are used for changing the orthogonal properties of the electromagnetic field of the degenerate triple-mode in the cavity and are not in parallel arrangement; each coupling device includes cut corners or holes or cut corners and holes disposed beside the edges of the dielectric resonance block, or includes chamfers/cut corners disposed beside the edges of the cavity, or includes the cut corners or holes or the cut corners and holes disposed beside the edges of the dielectric resonance block, and the chamfers/cut corners disposed beside the edges of the cavity, or includes tap wires/sheets disposed on the non-parallel plane in the cavity; each cut corner is in the shape of a triangular prism or a cuboid or a sector; and each hole is circular, rectangular or polygonal. After corner cutting or perforating, the side length of the dielectric resonance block increases under a condition of maintaining frequency, and the Q-value decreases slightly; a depth of the cut corner or the hole is of a through or partial cut corner/partial hole structure according to a required coupling quantity; the size of the cut corner/chamfer/hole affects the coupling quantity; coupling screws are disposed on a coupling device in the directions perpendicular or parallel to the cut corners or in the directions parallel to the holes, or in the directions perpendicular or parallel to the cut corners and in the directions parallel to the holes; the coupling screw is made of metal, or the coupling screw is made of metal, a surface of which is electroplated with copper or sliver, or the coupling screw is made of a dielectric, or the coupling screw is made of the dielectric, a surface of which is metallized; and the coupling screw is in a shape of any one of a metal rod, a dielectric rod, a metal disk, a dielectric disk, a metal rod with a metal disk, a metal rod with a dielectric disk, a dielectric rod with a metal disk, and a dielectric rod with a dielectric disk.

In some embodiments, the degenerate triple-mode in directions of axes X, Y and Z is formed in the cavity high-Q triple-mode dielectric resonance structure; the tuning frequency of the degenerate triple-mode in the X-axis direction is realized by adding debugging screws or tuning disks to places where a field strength is concentrated on one side or two sides of the X-axis corresponding to the cavity to change a distance or capacitance; a tuning frequency of the degenerate triple-mode in the Y-axis direction is realized by adding debugging screws or tuning disks to places where a field strength is concentrated on one side or two sides of the Y-axis corresponding to the cavity to change the distance or capacitance; and a tuning frequency of the degenerate triple-mode in the Z-axis direction can be realized by adding debugging screws or tuning disks to places where a field strength is concentrated on one side or two sides of the Z-axis corresponding to the cavity to change the distance or capacitance; in addition, a surface of the dielectric resonance block, the inner wall of the cavity body, or an inner wall of the cover plate, and the bottom of the tuning screw is pasted with dielectric constant thin films having different shapes and thicknesses; the thin film is made of ceramic dielectric and ferroelectric materials; the frequency of the degenerate triple-mode is adjusted by changing the dielectric constant; the tuning screw or the tuning disk is made of metal, or the tuning screw or the tuning disk is made of metal, a surface of which is electroplated with copper or silver; or the tuning screw or the turning disk are made of a dielectric; or the tuning screw or the tuning disk is made of a dielectric, a surface of which is metalized; and the tuning screw is in a shape of any one of a metal rod, a dielectric rod, a metal disk, a dielectric disk, a metal rod with a metal disk, and a metal rod with a dielectric disk, a dielectric rod with a metal disk, and a dielectric rod with a dielectric disk. A frequency temperature coefficient of the cube-like dielectric resonance block is controlled by adjusting the ratio of dielectric materials, and is compensated according to the frequency deviation change of the filter under different temperature conditions; when the dielectric support frame is fixed to an inner wall of the cavity body, an elastomer is adopted for transition between the dielectric support frame and the inner wall of the cavity body to avoid a stress generated by the cavity body and the dielectric material in an environment of sudden temperature changes and buffer a reliability risk caused by material expansion coefficients.

In some embodiments, the cavity high-Q triple-mode dielectric resonance structure includes the cavity, the dielectric resonance block and the support frames. When the cavity is cube-like, the single cube-like dielectric resonance block and the dielectric support frames are arranged in any axial direction of the cavity, a center of the dielectric resonance block coincides with or is close to a center of the cavity. The air-like support frames support any single surface of the cube-like dielectric block, or support six surfaces, or different two surfaces, three surfaces, four surfaces and five surfaces in different combinations; each surface is supported by one dielectric support frame or the plurality of dielectric support frames; and the one or the plurality of dielectric support frames is disposed on different surfaces according to needs. A support frame with the dielectric constant which is greater than a dielectric constant of air and is less than the dielectric constant of the dielectric resonance block supports any single surface of the cube-like dielectric block, or supports six surfaces, or different two surfaces, three surfaces, four surfaces and five surfaces in different combinations; the surface without the support frame is air; a air surface is arbitrarily combined with the dielectric support frame; each surface is supported by one dielectric support frame or the plurality of dielectric support frames, or a composite dielectric constant support frames made of a plurality of layers of different dielectric constant dielectric materials; a single-layer or multiple-layer dielectric material support frames are arbitrarily combined with the cube-like dielectric block; one or a plurality of support frames are arranged on different surfaces according to needs; and in order to maintain a frequency and Q-value of the triple-mode, a size of the dielectric support frame corresponding to an axial direction of the dielectric resonance block is slightly reduced. The support combination of the single surface is used to support any one surface of the dielectric resonance block, especially a bottom surface or a load-bearing surface in a vertical direction; a support combination of two surfaces includes parallel surfaces such as upper and lower surfaces, front and rear surfaces, and left and right surfaces, also includes non-parallel surfaces such as a upper surface and a front surface, a upper surface and a left surface, and a upper surface and a right surface; a support combination of three surfaces includes three mutually perpendicular surfaces or two parallel surfaces and one non-parallel surface; a support combination of four surfaces includes two pairs of parallel surfaces or a pair of parallel surfaces and the other two non-parallel surfaces; the support combination of five surfaces includes a support structure on other faces except any one surface of the front surface/rear surface/left surface/right surface/upper surface/lower surface; and the support combination of the six surfaces includes support structures of the front surface/rear surface/left surface/right surface/upper surface/lower surface.

In some embodiments, any end of the cube-like dielectric resonance block and the dielectric support frame are connected by crimping, bonding or sintering; for connection of one surface or combined connection of different surfaces, a plurality of layers of dielectric support frames are fixed by a mode of bonding, sintering, crimping and other manners; the dielectric support frames and the inner wall of the cavity body are connected by fixing manners such as bonding, crimping, welding, sintering and bolts; a radio frequency channel formed by coupling of radio frequency signals in three directions of axes X, Y and Z of triple-mode causes loss and generates heat; and the dielectric resonance block is fully connected with the inner wall of the metal through the dielectric support frame to guide heat into a cavity for heat dissipation.

In some embodiments, the cube-like dielectric resonance block has a single dielectric constant or a composite dielectric constant; the dielectric resonance block with the composite dielectric constant is made of two or more materials with different dielectric constants; materials with different dielectric constants is combined by up and down, or left and right, or asymmetric or nested manners to form the dielectric resonance block with the composite dielectric constant; when the materials of different dielectric constants are nested in the dielectric resonance block, one layer of or a plurality of layers of materials are nested in the dielectric resonance block; and the dielectric resonance block with the composite dielectric constant needs to meet the a change variation rules of Q-value conversion points. When side cutting coupling is performed among triple modes of the dielectric resonance block, in order to maintain a required frequency, corresponding side lengths of two surfaces adjacent to cut sides are adjusted in parallel; the dielectric resonance block is made of ceramic or dielectric materials; and a surface of the dielectric resonance block is added with dielectric sheets with different thicknesses and different dielectric constants.

In some embodiments, the dielectric constant of the dielectric support frame is similar to the dielectric constant of air, or the dielectric constant of the support frame is greater than the dielectric constant of air and is less than the dielectric constant of the dielectric resonance block; a surface area of the dielectric support frame is less than or equal to a surface area of the cube-like dielectric resonance block;

and the dielectric support frame is cylindrical, square or rectangular solid-shaped. The dielectric support frame is of a solid structure or a hollow structure; the dielectric support frame being of the hollow structure includes a single hole or a plurality of holes; each of the single hole or a plurality of holes is round, square, polygonal and arc; the dielectric support frame is made of plastic, ceramic, and dielectrics, or the dielectric support frame is air; the dielectric support frame is connected with the dielectric resonance block; when the dielectric constant of the dielectric support frame is similar to the dielectric constant of air, the dielectric support has no effect on the triple-mode resonance frequency; when the dielectric constant of the dielectric support frame is greater than the dielectric constant of air but less than the dielectric constant of the dielectric resonance block, in order to maintain the original triple-mode frequency, a size of the dielectric support frame, which corresponds to an axial direction of the dielectric resonance block, is slightly reduced; the support frame with the dielectric constant being similar to the dielectric constant of air, and the support frame with the dielectric constant being greater than the dielectric constant of air and being less than the dielectric constant of the dielectric resonance block are arranged in different directions and different corresponding surfaces of the dielectric resonator block in combination. When the above two support frames with different dielectric constants are used in combination, the size of the support frame with the dielectric constant being greater than the dielectric constant of air, which corresponds to the axial direction of the dielectric resonance block, is slightly reduced on the original basis.

In some embodiments, the cavity is cube-like; a coupling among the triple modes is realized by performing side cutting on any two adjacent surfaces of the cavity under a premise that a size of the cube-like dielectric resonance block is not changed; a size of the cut side is related to a required coupling quantity; a coupling between the two modes in the triple-mode coupling is realized by the cut sides of the cube-like cavity; the remaining coupling is realized by cutting corners at the two adjacent sides of the cavity; a wall cannot be broken when the corners are cut at the adjacent sides of the cavity; corner cutting surfaces need to be completely sealed with the cavity. The cavity is made of metal or nonmetal materials; the metal or nonmetal surface is electroplated with copper or silver; and when the cavity is made of the nonmental materials, the inner wall of the cavity is electroplated with conductive materials such as silver or copper, for example, the plastic and composite material surface is electroplated with the copper or the silver In some embodiments, the cavity high-Q triple-mode dielectric resonance structure, the single-mode resonance structure, the two-mode resonance structure, and a triple-mode resonance structure are combined in different forms to form filters of different volumes; a coupling between any two resonance cavities formed by an arrangement and combination of the high-Q triple-mode dielectric resonance structure, the single-mode resonance cavity, the two-mode resonance cavity, and the triple-mode resonance cavity is only realized through the window size between the two resonance cavities under the condition that two resonance rods in the two resonance cavities are parallel; the window size is determined according to the coupling quantity; and the filters have the functional characteristics that the filters include but are not limited to band pass filters, band stop filters, high pass filters, and low pass filters, and the filters form duplexers, multiplexers and combiners.

The dielectric constant of the cube-like dielectric resonance block of the present disclosure is greater than the dielectric constant of the support frame. When a ratio of the single side size of the inner wall of the cavity to the single side size of the dielectric resonance block is between 1.03-1.30, the Q-value of the higher-order mode is inverted to the Q-value of the base mode, the Q-value of the triple-mode dielectric base mode is increased, and the Q-value of the higher-order mode is reduced. Compared with traditional single-mode dielectric filters and triple-mode dielectric filters, the Q-value of the filter is increased by more than 30% under a same volume and frequency; according to this rule, the triple-mode structure is combined with different types of single cavities, for example, the triple-mode structure is combined with a cavity single-mode, the triple-mode structure is combined with a TM mode, and the triple-mode is combined with a TE single mode. The more triple-mode is used in the filter, the smaller a filter volume is, and the smaller the insertion loss is; and the cavity high-Q multi-mode dielectric resonance structure can produce triple-mode resonances in directions of axes X, Y, and Z respectively.

When a ratio of the side length of the inner wall of the cavity to the corresponding side length of the dielectric resonance block is between 1.0 to the conversion point 1 of the Q-value conversion, particularly when the ratio is 1.0, the cavity has the Q-value of a pure dielectric, and when the cavity size increases, the Q-value constantly increases on a basis of the Q-value of the pure dielectric, the Q-value of the higher-order mode is greater than the Q-value of the base mode; and when the ratio increases to the conversion point 1, the Q-value of an original higher-order mode is approximate to a new Q-value of the base mode.

After the ratio enters the conversion point 1, the Q-value of the base mode is greater than the Q-value of the higher-order mode under a condition of keeping the resonance frequency of the base mode unchanged. With an increase of the ratio, as sizes of the dielectric block and cavity increase, the Q-value of the base mode increases, and the Q-value of the higher-order mode increases at a same time. When the ratio is approximate to the conversion point 2 of Q-value, the Q-value of the base mode is highest. When the ratio is between the conversion point 1 of the Q-value of the base mode and the conversion point 2 of the Q-value of the base mode, a frequency of the higher-order mode is sometimes far from and sometimes approximate to a frequency of the base mode with the variation of the ratio of the cavity to the dielectric resonance block between the conversion point 1 and the conversion point 2.

After the ratio enters the conversion point 2, the Q-value of the base mode is less than the Q-value of the higher-order mode. With an increase of the ratio, as the size of the dielectric resonance block decreases, the size of the cavity increase, the Q-value of the base mode constantly increases; and when the ratio is approximate to the conversion point 3, the Q-value of the base mode is approximate to the Q-value at the conversion point 2.

After the ratio enters the conversion point 3, the Q-value of the base mode increases with an increase of the ratio, the Q-value of the higher-order mode decreases with an increase of the ratio, the size of the dielectric resonance block decreases with an increase of the ratio, and the size of the cavity constantly increases. When the size of the cavity is approximate to the ¾ wavelength size of the cavity, as the size of the dielectric resonance block constantly decreases, the Q-value of the base mode decreases accordingly, and the frequency of the higher-order mode is sometimes far from and sometimes approximate to the frequency of the base mode with the increase of the ratio. A specific ratio of the conversion point is related to the dielectric constant and frequency of the dielectric resonance block and whether the dielectric resonator block has the single or composite dielectric constant.

A side length of the inner wall of the cavity and a side length of the dielectric resonance block can have equal or unequal size in three directions of axes X, Y and Z. When the cavity and the cub-like dielectric resonance block have equal sizes in three directions of axes X, Y and Z, a triple-mode is formed; when the cavity and the cub-like dielectric resonance block have slightly unequal sizes in three directions of axes X, Y and Z, a triple-mode is formed; when the size of the cavity body in one of directions of axes X, Y and Z and the corresponding single side size of the dielectric resonance block are different from the single side sizes in the other two directions, or a symmetrical single side sizes of any one of the cavity body and the dielectric resonance block are different from the single side sizes in the other two directions, a frequency of one of the triple modes changes and is different from a frequency of the other two modes. The greater a size difference is, the greater a frequency difference between one mode and the other two modes is. When a size in one direction is greater than sizes in the other two directions, the frequency drops on the original basis. When the size in one direction is smaller than the size in the other two directions, the frequency rises on an original basis, and thus, the triple-mode is gradually turned into a two-mode or a single-mode; when the cavity and the dielectric resonance block have greatly different sizes in three directions of axes X, Y and Z, and the symmetrical single side sizes in three directions of axes X, Y and Z are different, the frequency of the triple modes in the triple-mode are different; in a case where side length sizes in the three directions differ greatly, the base mode is a single-mode; in a case where a side length sizes in the three directions are slightly different, a frequency difference is not large; and although the frequency changes, a triple-mode state can still be maintained by the tuning device.

The coupling among the triple modes can adopt at least two coupling devices which are arranged in the cavity high-Q triple-mode dielectric resonance structure, and are used for changing the orthogonal properties of the electromagnetic field of the degenerate triple-mode in the cavity and are not in parallel arrangement; each coupling device includes cut corners or holes or corners and holes disposed beside the edges of the dielectric resonance block, or includes chamfers/cut corners disposed beside the edges of the cavity, or includes the cut corners or holes or corners and holes disposed beside the edges of the dielectric resonance block, and the chamfers/cut corners disposed beside the edges of the cavity, or includes tap wires or/sheets disposed on the non-parallel planes in the cavity; each cut corner is in the shape of a triangular prism or a cuboid or a sector; and each hole is circular, rectangular or polygonal. After corner cutting or perforating, under the condition of maintaining frequency, the side length of the dielectric resonance block increases, and the Q-value decreases slightly; the depth of the cut corner or the hole is of a through or partial cut corner/partial hole structure according to the required coupling quantity; and the size of the cut corner/chamfer/hole affects the coupling quantity. Coupling screws are arranged on coupling devices in the directions perpendicular or parallel to the cut corners or in the directions parallel to the holes or in the directions perpendicular or parallel to the cut corners and in the directions parallel to the holes; the coupling screw is made of metal, or the coupling screw is made of metal, the surface of which is electroplated with copper or sliver, or the coupling screw is made of a dielectric, or the coupling screw is made of a dielectric, the surface of which is metallized; and the coupling screw is in the shape of any one of a metal rod, a dielectric rod, a metal disk, a dielectric disk, the metal rod with the metal disk, the metal rod with the dielectric disk, the dielectric rod with the metal disk, and the dielectric rod with the dielectric disk.

The tuning frequency of the triple-mode in the X-axis direction is realized by adding debugging screws or tuning disks to the places where the field strength is concentrated on one side or two sides of the X-axis corresponding to the cavity to change the distance or capacitance; the tuning frequency of the triple-mode in the Y-axis direction is realized by adding debugging screws or tuning disks to the places where the field strength is concentrated on one side or two sides of the Y-axis corresponding to the cavity to change the distance or capacitance; and the tuning frequency of the triple-mode in the Z-axis direction is realized by adding debugging screws or tuning disks to the places where the field strength is concentrated on one side or two sides of the Z-axis corresponding to the cavity to change the distance or capacitance.

The Q-value conversion triple-mode structure of a dielectric resonator, the single-mode resonance cavity, the two-mode resonance cavity or the triple-mode resonance cavity are arbitrarily arranged and combined in different forms to form the required filters of different sizes; the filters have the functional characteristics that the filters include but are not limited to band pass filters, band stop filters, high pass filters, and low pass filters, and the filters form duplexers and multiplexers; and the coupling between any two resonance cavities formed by the arrangement and combination of the single-mode resonance cavity, the two-mode resonance cavity or the triple-mode resonance cavity is realized through the window size between the two resonance cavities under the condition that two resonance structures are parallel.

Some embodiments of the present disclosure has beneficial effects that the cavity high-Q triple-mode dielectric resonance structure is simple and convenient to use; by setting the ratio of the single side size of the inner wall of the metal cavity of the dielectric multimode structure to the single side size of the dielectric resonance block between 1.01 and 1.30, the resonance rod is cooperated with the cavity body to form the multi-mode structure, meanwhile a reversion of specific parameters is realized, and thus, the high Q-value is obtained at a smaller spacing between the resonance rod and a cavity body; further, some embodiments of the present disclosure discloses the filter with the high-Q triple-mode dielectric resonance structure; and compared with a traditional triple-mode filter, the insertion loss of the filter is reduced by the more than 30% under the premise of the same frequency and same volume. The magnetic fields of a frequency conversion multimode structure of a dielectric resonator formed by a cube-like dielectric resonance block, a dielectric support frame and the cavity body cover plate in three directions of axes X, Y and Z of the cavity body are mutually orthogonal and perpendicular to form three resonance modes that do not interfere with each other; and the frequency of the higher-order mode is converted into the frequency of the high-Q base mode to form coupling the among three magnetic fields. The strength of the coupling is adjusted to meet the different bandwidth requirements of the filter. When the two filters with the high-Q triple-mode dielectric structures are used in a typical 1800-MHz frequency filter, the volume of the filter is equivalent to the volume of six single cavities of an original cavity, and the volume is reduced by 40% on a basis of the original cavity filter, and the insertion loss can also be reduced by about 30%. As the volume is greatly reduced, processing man-hours and the plating area are reduced accordingly; although the dielectric resonance block is used, the cost of the dielectric resonance block is equivalent to the cost of the cavity; if the material cost of the dielectric resonance block can be greatly reduced, the cost advantage of this design will be more obvious; when there are more filter cavity bodies, even 3 triple-mode structures can be used, and advantages brought by the volume and performances are more obvious.

Figure 1:
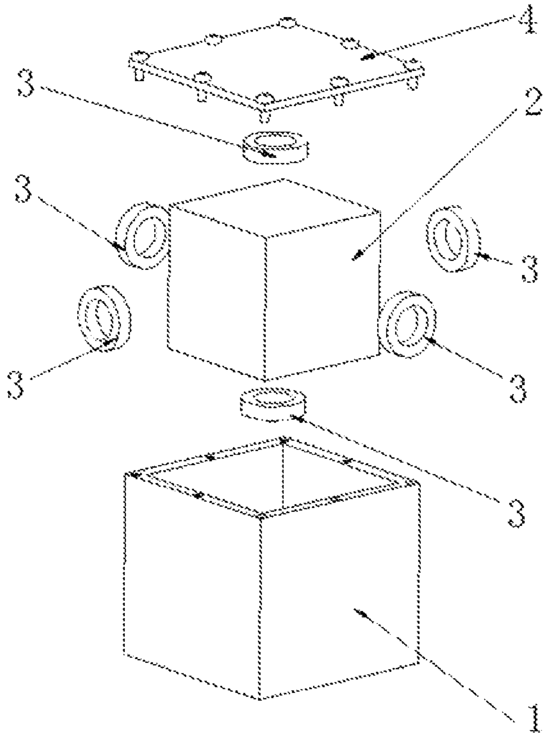
FIG. 1 illustrates an assembly drawing of a cavity high-Q triple-mode dielectric resonance structure including a plurality of dielectric support frames.

In drawings: 1. cavity body; 2. dielectric resonance block; 3. dielectric support frame; 4. cover plate; 5. coupling among multi-mode; 6. input/output; 7. mode tuning screw; 8. multi-mode coupling screw; 9. transverse window between multi-mode and metal bars.

DETAILED DESCRIPTION OF THE EMBODIMENTS

The present disclosure will be further described in detail below with reference to the drawings in conjunction with specific embodiments. The drawing and specific embodiments facilitate a clear understanding of the present disclosure, but do not limit the present disclosure. In order to highlight the content of the present disclosure, some common technologies in the cavity, such as tuning screws, coupling screws, booms, boom seats, and nut fixing, and fixing and installation methods of some dielectric resonators such as bonding, welding, sintering and crimping methods will not be repeated here.

The cavity high-Q triple-mode dielectric resonance structure includes a cavity body 1 and a cover plate 4, wherein the cavity 1 and the cover plate 4 are tightly connected; a dielectric resonance block 2 and a dielectric support frame 3 are disposed in the cavity body; and the dielectric support frame is connected with the inner wall of the cavity body.

Some embodiments of the present disclosure disclose a cavity high-Q triple-mode dielectric resonance structure applied to the filter. The triple-mode dielectric resonance structure includes a cavity and a cover plate, wherein a dielectric resonance block and a dielectric support frame are arranged inside the cavity; the dielectric resonance block is of a cube-like solid structure; the dielectric support frame is respectively connected with the dielectric resonance block and an inner wall of the cavity; the dielectric resonance block and the dielectric support frame form a triple-mode dielectric resonance rod; a dielectric constant of the dielectric support frame is less than a dielectric constant of the dielectric resonance block; a ratio K of a size of single side of the inner wall of the cavity to a size of the corresponding single side of the dielectric resonance block is as follows: when K is greater than or equal to a conversion point 1 and is less than or equal to a conversion point 2, a Q-value of a higher-order mode adjacent to a base mode, of the triple-mode dielectric resonance structure is converted into the Q-value of the base mode of the triple-mode dielectric resonance structure, the resonance frequency of the base mode after conversion is equal to the resonance frequency of the base mode before conversion, the Q-value of the base mode after conversion is greater than the Q-value of the base mode before conversion, the resonance frequency of the higher-order mode adjacent to the base mode after conversion is equal to the resonance frequency of the higher-order mode adjacent to the base mode before conversion, and the Q-value of the higher-order mode adjacent to the base mode after conversion is less than the Q-value of the higher-order mode adjacent to the base mode before conversion; the triple-mode dielectric resonance structure is internally provided with a coupling structure for changing orthogonal properties of electromagnetic field of a degenerate triple-mode in the cavity; and the triple-mode dielectric resonance structure is internally provided with a frequency tuning device for changing tuning frequency of the degenerate triple-mode in the cavity.

In some embodiments of the present disclosure, a value of the conversion point 1 and a value of the conversion point 2 both vary according to different resonance frequencies of the base mode of the dielectric resonance block, a dielectric constant of the dielectric resonance block, and a dielectric constant of the support frame.

In some embodiments of the present disclosure, when the resonance frequency of the base mode of the dielectric resonance block after conversion remains unchanged, a Q-value of the triple-mode dielectric resonance structure is related to the ratio K, the dielectric constant of the dielectric resonance block and the size of the dielectric resonance block.

In some embodiments of the present disclosure, when the ratio K increases from 1.0 to a maximum, the ratio K has triple Q-value conversion points in a variation range; and each Q-value conversion point enables the Q-value of the base mode and the Q-value of the higher-order mode adjacent to the base mode to be converted; and when the Q-value of the higher-order mode adjacent to the base mode is converted into the Q-value of the base mode, the Q-value of the base mode is higher than the Q-value of the base mode before conversion.

In some embodiments of the present disclosure, in four regions formed by a starting point, an ending point and triple Q-value conversion points of the ratio K, the Q-value of the base mode and the Q-value of the higher-order mode adjacent to the base mode change gradually vary with a variation of a size of a cavity body and a size of the dielectric resonance block, and requirements for applications of different regions in the filter are different.

In some embodiments of the present disclosure, the value of the conversion point 1 is greater than or equal to 1.03 and is less than or equal to 1.25; the value of the conversion point 2 is greater than or equal to 1.03 and is less than or equal to 1.25; and the value of the conversion point 1 is less than the value of the conversion point 2.

In some embodiments of the present disclosure, a coupling structure is disposed on the dielectric resonance block; and the coupling structure includes at least two structures which include at least one type of holes, grooves, cut corners, and chamfers which are not in parallel arrangement.

In some embodiments of the present disclosure, the grooves or the cut corners or the chamfers are disposed on edges of the dielectric resonance block.

In some embodiments of the present disclosure, the holes or the grooves are disposed on the end surfaces of the dielectric resonance block, and the center lines of the holes or the grooves are parallel to the edges perpendicular to the end surfaces with the holes or the grooves on the dielectric resonance block.

In some embodiments of the present disclosure, the coupling structure is disposed on the cavity; and the coupling structure includes at least two chamfers or bosses or chamfers and bosses not in parallel arrangement at the inner corners of the cavity, or tap wires/sheets disposed in the cavity and not in contact with the dielectric resonance block, or the coupling structure includes at least two chamfers or bosses or chamfers and bosses not in parallel arrangement at the inner corners of the cavity, and tap wires/sheets disposed in the cavity and not in contact with the dielectric resonance block.

In some embodiments of the present disclosure, the frequency tuning device includes at least one type of a tuning screw/disk disposed on the cavity, a thin film disposed on the surface of a dielectric resonance block, a thin film disposed on the inner wall of the cavity and a thin film disposed on the inner wall of the cover plate.

In some embodiments of the present disclosure, at least one end surface of the dielectric resonance block is disposed at least one dielectric support frame.

Some embodiments of the present disclosure also disclose a filter including the high-Q triple-mode dielectric resonance structure. The filter includes a cavity body, a cover plate and an input-output structure, wherein at least one high-Q triple-mode dielectric resonance structure is disposed in the cavity body.

In some embodiments of the present disclosure, the high-Q triple-mode dielectric resonance structure, a single-mode resonance structure, a two-mode resonance structure, and a triple-mode resonance structure are combined in different forms to form filters of different volumes; a coupling between any two resonance cavities formed by the arrangement and combination of the high-Q triple-mode dielectric resonance structure, a single-mode resonance cavity, a two-mode resonance cavity, and a triple-mode resonance cavity is only realized through a window size between the two resonance cavities under the condition that two resonance rods in the two resonance cavities are parallel; the window size is determined according to the coupling quantity; and the filters have functional characteristics that the filters include but are not limited to band pass filters, band stop filters, high pass filters, and low pass filters, and filters form duplexers, multiplexers and combiners.

In some embodiments of the present disclosure, under a condition that the resonance frequency of the cavity high-Q triple-mode dielectric resonance structure remains unchanged, the Q-value of the triple-mode dielectric resonance structure is related to a ratio K of a side length of the inner wall of the cavity body to a side length of the dielectric resonance block, a dielectric constant of the dielectric resonance block, and a size variation range of a dielectric block; and a range of the ratio K is related to different resonance frequencies, and the dielectric constants of the dielectric resonance rod and the support frame.

According to the above embodiment, when the ratio K of the side length size of the inner wall of the cavity to the size of the dielectric resonance block in the cavity high-Q triple-mode dielectric resonance structure increases from 1.0 to the maximum in a variation range, the ratio K has three conversion points in the variation range; each conversion point enables the Q-value of the resonance frequency of the base mode and the Q-value of the resonance frequency of the adjacent higher-order mode to be converted; and when the Q-value of the adjacent higher-order mode is converted into the Q-value of the base mode, the Q-value of the base mode is higher than the Q-value of the base mode before conversion.

In some embodiments, in the four regions formed by a starting point, a ending point and the three Q-value conversion points of the ratio K, the Q-value of the base mode and the Q-value of the adjacent higher-order mode vary gradually with the variation of the size of the cavity body and the size of the dielectric resonance block; and requirements for applications of different regions in the filter are different.

In some embodiments, the dielectric resonance block of the present disclosure is of a cube-like solid structure, wherein definition of a cube-like shape is as follows: the dielectric resonance block is a cuboid or a cube; when the dielectric resonance block has equal sizes in three directions of axes X, Y and Z, a degenerate triple-mode is formed and is coupled with other single cavities to form a band-pass filter; when the dielectric resonance block has slightly unequal sizes in three directions of axes X, Y and Z, an orthogonal-like triple-mode resonance is formed; if the orthogonal-like triple-mode is still coupled with other cavities to form the band-pass filter, sizes are all acceptable; if the orthogonal-like triple-mode is not coupled with other cavities to form the band-pass filter, the sizes are unacceptable; and when the differences of the sizes of the dielectric resonance block in three directions of axes X, Y and Z are greatly different, the degenerate triple-mode or the orthogonal-like triple-mode is not formed, but three modes with different frequencies are formed, thus, the three modes with different frequencies are not coupled with other cavities to form the band-pass filter, and the sizes are not acceptable.

In some embodiments, the cavity high-Q triple-mode dielectric resonance structure is internally provided with at least two coupling devices which are used for changing the orthogonal properties of the electromagnetic field of the degenerate triple-mode in the cavity and are not in parallel arrangement; each coupling device includes cut corners or holes or cut corners and holes disposed beside the edges of the dielectric resonance block, or includes chamfers/cut corners disposed beside the edges of the cavity, or includes the cut corners or holes or the cut corners and holes disposed beside the edges of the dielectric resonance block, and the chamfers/cut corners disposed beside the edges of the cavity, or includes tap wires/sheets disposed on the non-parallel plane in the cavity; each cut corner is in the shape of a triangular prism or a cuboid or a sector; and each hole is circular, rectangular or polygonal. After corner cutting or perforating, the side length of the dielectric resonance block increases under a condition of maintaining frequency, and the Q-value decreases slightly; a depth of the cut corner or the hole is of a through or partial cut corner/partial hole structure according to a required coupling quantity; the size of the cut corner/chamfer/hole affects the coupling quantity; coupling screws are disposed on a coupling device in the directions perpendicular or parallel to the cut corners or in the directions parallel to the holes, or in the directions perpendicular or parallel to the cut corners and in the directions parallel to the holes; the coupling screw is made of metal, or the coupling screw is made of metal, a surface of which is electroplated with copper or sliver, or the coupling screw is made of a dielectric, or the coupling screw is made of the dielectric, a surface of which is metallized; and the coupling screw is in a shape of any one of a metal rod, a dielectric rod, a metal disk, a dielectric disk, a metal rod with a metal disk, a metal rod with a dielectric disk, a dielectric rod with a metal disk, and a dielectric rod with a dielectric disk.

In some embodiments, the degenerate triple-mode in directions of axes X, Y and Z is formed in the cavity high-Q triple-mode dielectric resonance structure; the tuning frequency of the degenerate triple-mode in the X-axis direction is realized by adding debugging screws or tuning disks to places where a field strength is concentrated on one side or two sides of the X-axis corresponding to the cavity to change a distance or capacitance; a tuning frequency of the degenerate triple-mode in the Y-axis direction is realized by adding debugging screws or tuning disks to places where a field strength is concentrated on one side or two sides of the Y-axis corresponding to the cavity to change the distance or capacitance; and a tuning frequency of the degenerate triple-mode in the Z-axis direction can be realized by adding debugging screws or tuning disks to places where a field strength is concentrated on one side or two sides of the Z-axis corresponding to the cavity to change the distance or capacitance; in addition, a surface of the dielectric resonance block, the inner wall of the cavity body, or an inner wall of the cover plate, and the bottom of the tuning screw is pasted with dielectric constant thin films having different shapes and thicknesses; the thin film is made of ceramic dielectric and ferroelectric materials; the frequency of the degenerate triple-mode is adjusted by changing the dielectric constant; the tuning screw or the tuning disk is made of metal, or the tuning screw or the tuning disk is made of metal, a surface of which is electroplated with copper or silver; or the tuning screw or the turning disk are made of a dielectric; or the tuning screw or the tuning disk is made of a dielectric, a surface of which is metalized; and the tuning screw is in a shape of any one of a metal rod, a dielectric rod, a metal disk, a dielectric disk, a metal rod with a metal disk, and a metal rod with a dielectric disk, a dielectric rod with a metal disk, and a dielectric rod with a dielectric disk. A frequency temperature coefficient of the cube-like dielectric resonance block is controlled by adjusting the ratio of dielectric materials, and is compensated according to the frequency deviation change of the filter under different temperature conditions; when the dielectric support frame is fixed to an inner wall of the cavity body, an elastomer is adopted for transition between the dielectric support frame and the inner wall of the cavity body to avoid a stress generated by the cavity body and the dielectric material in an environment of sudden temperature changes and buffer a reliability risk caused by material expansion coefficients.

In some embodiments, the cavity high-Q triple-mode dielectric resonance structure includes the cavity, the dielectric resonance block and the support frames. When the cavity is cube-like, the single cube-like dielectric resonance block and the dielectric support frames are arranged in any axial direction of the cavity, a center of the dielectric resonance block coincides with or is close to a center of the cavity. The air-like support frames support any single surface of the cube-like dielectric block, or support six surfaces, or different two surfaces, three surfaces, four surfaces and five surfaces in different combinations; each surface is supported by one dielectric support frame or the plurality of dielectric support frames; and the one or the plurality of dielectric support frames is disposed on different surfaces according to needs. A support frame with the dielectric constant which is greater than a dielectric constant of air and is less than the dielectric constant of the dielectric resonance block supports any single surface of the cube-like dielectric block, or supports six surfaces, or different two surfaces, three surfaces, four surfaces and five surfaces in different combinations; the surface without the support frame is air; a air surface is arbitrarily combined with the dielectric support frame; each surface is supported by one dielectric support frame or the plurality of dielectric support frames, or a composite dielectric constant support frames made of a plurality of layers of different dielectric constant dielectric materials; a single-layer or multiple-layer dielectric material support frames are arbitrarily combined with the cube-like dielectric block; one or a plurality of support frames are arranged on different surfaces according to needs; and in order to maintain a frequency and Q-value of the triple-mode, a size of the dielectric support frame corresponding to an axial direction of the dielectric resonance block is slightly reduced. The support combination of the single surface is used to support any one surface of the dielectric resonance block, especially a bottom surface or a load-bearing surface in a vertical direction; a support combination of two surfaces includes parallel surfaces such as upper and lower surfaces, front and rear surfaces, and left and right surfaces, also includes non-parallel surfaces such as a upper surface and a front surface, a upper surface and a left surface, and a upper surface and a right surface; a support combination of three surfaces includes three mutually perpendicular surfaces or two parallel surfaces and one non-parallel surface; a support combination of four surfaces includes two pairs of parallel surfaces or a pair of parallel surfaces and the other two non-parallel surfaces; the support combination of five surfaces includes a support structure on other faces except any one surface of the front surface/rear surface/left surface/right surface/upper surface/lower surface; and the support combination of the six surfaces includes support structures of the front surface/rear surface/left surface/right surface/upper surface/lower surface.

In some embodiments, any end of the cube-like dielectric resonance block and the dielectric support frame are connected by crimping, bonding or sintering; for connection of one surface or combined connection of different surfaces, a plurality of layers of dielectric support frames are fixed by a mode of bonding, sintering, crimping and other manners; the dielectric support frames and the inner wall of the cavity body are connected by fixing manners such as bonding, crimping, welding, sintering and bolts; a radio frequency channel formed by coupling of radio frequency signals in three directions of axes X, Y and Z of triple-mode causes loss and generates heat; and the dielectric resonance block is fully connected with the inner wall of the metal through the dielectric support frame to guide heat into a cavity for heat dissipation.

In some embodiments, the cube-like dielectric resonance block has a single dielectric constant or a composite dielectric constant; the dielectric resonance block with the composite dielectric constant is made of two or more materials with different dielectric constants; materials with different dielectric constants is combined by up and down, or left and right, or asymmetric or nested manners to form the dielectric resonance block with the composite dielectric constant; when the materials of different dielectric constants are nested in the dielectric resonance block, one layer of or a plurality of layers of materials are nested in the dielectric resonance block; and the dielectric resonance block with the composite dielectric constant needs to meet the a change variation rules of Q-value conversion points. When side cutting coupling is performed among triple modes of the dielectric resonance block, in order to maintain a required frequency, corresponding side lengths of two surfaces adjacent to cut sides are adjusted in parallel; the dielectric resonance block is made of ceramic or dielectric materials; and a surface of the dielectric resonance block is added with dielectric sheets with different thicknesses and different dielectric constants.

In some embodiments, the dielectric constant of the dielectric support frame is similar to the dielectric constant of air, or the dielectric constant of the support frame is greater than the dielectric constant of air and is less than the dielectric constant of the dielectric resonance block; a surface area of the dielectric support frame is less than or equal to a surface area of the cube-like dielectric resonance block; and the dielectric support frame is cylindrical, square or rectangular solid-shaped. The dielectric support frame is of a solid structure or a hollow structure; the dielectric support frame being of the hollow structure includes a single hole or a plurality of holes; each of the single hole or a plurality of holes is round, square, polygonal and arc; the dielectric support frame is made of plastic, ceramic, and dielectrics, or the dielectric support frame is air; the dielectric support frame is connected with the dielectric resonance block; when the dielectric constant of the dielectric support frame is similar to the dielectric constant of air, the dielectric support has no effect on the triple-mode resonance frequency; when the dielectric constant of the dielectric support frame is greater than the dielectric constant of air but less than the dielectric constant of the dielectric resonance block, in order to maintain the original triple-mode frequency, a size of the dielectric support frame, which corresponds to an axial direction of the dielectric resonance block, is slightly reduced; the support frame with the dielectric constant being similar to the dielectric constant of air, and the support frame with the dielectric constant being greater than the dielectric constant of air and being less than the dielectric constant of the dielectric resonance block are arranged in different directions and different corresponding surfaces of the dielectric resonator block in combination. When the above two support frames with different dielectric constants are used in combination, the size of the support frame with the dielectric constant being greater than the dielectric constant of air, which corresponds to the axial direction of the dielectric resonance block, is slightly reduced on the original basis.

In some embodiments, the cavity is cube-like; a coupling among the triple modes is realized by performing side cutting on any two adjacent surfaces of the cavity under a premise that a size of the cube-like dielectric resonance block is not changed; a size of the cut side is related to a required coupling quantity; a coupling between the two modes in the triple-mode coupling is realized by the cut sides of the cube-like cavity; the remaining coupling is realized by cutting corners at the two adjacent sides of the cavity; a wall cannot be broken when the corners are cut at the adjacent sides of the cavity; corner cutting surfaces need to be completely sealed with the cavity. The cavity is made of metal or nonmetal materials; the metal or nonmetal surface is electroplated with copper or silver; and when the cavity is made of the nonmental materials, the inner wall of the cavity is electroplated with conductive materials such as silver or copper, for example, the plastic and composite material surface is electroplated with the copper or the silver In some embodiments, the cavity high-Q triple-mode dielectric resonance structure, the single-mode resonance structure, the two-mode resonance structure, and a triple-mode resonance structure are combined in different forms to form filters of different volumes; a coupling between any two resonance cavities formed by an arrangement and combination of the high-Q triple-mode dielectric resonance structure, the single-mode resonance cavity, the two-mode resonance cavity, and the triple-mode resonance cavity is only realized through the window size between the two resonance cavities under the condition that two resonance rods in the two resonance cavities are parallel; the window size is determined according to the coupling quantity; and the filters have the functional characteristics that the filters include but are not limited to band pass filters, band stop filters, high pass filters, and low pass filters, and the filters form duplexers, multiplexers and combiners.

The dielectric constant of the cube-like dielectric resonance block of the present disclosure is greater than the dielectric constant of the support frame. When a ratio of the single side size of the inner wall of the cavity to the single side size of the dielectric resonance block is between 1.03-1.30, the Q-value of the higher-order mode is inverted to the Q-value of the base mode, the Q-value of the triple-mode dielectric base mode is increased, and the Q-value of the higher-order mode is reduced. Compared with traditional single-mode dielectric filters and triple-mode dielectric filters, the Q-value of the filter is increased by more than 30% under a same volume and frequency; according to this rule, the triple-mode structure is combined with different types of single cavities, for example, the triple-mode structure is combined with a cavity single-mode, the triple-mode structure is combined with a TM mode, and the triple-mode is combined with a TE single mode. The more triple-mode is used in the filter, the smaller a filter volume is, and the smaller the insertion loss is; and the cavity high-Q multimode dielectric resonance structure can produce triple-mode resonances in directions of axes X, Y, and Z respectively.

When a ratio of the side length of the inner wall of the cavity to the corresponding side length of the dielectric resonance block is between 1.0 to the conversion point 1 of the Q-value conversion, particularly when the ratio is 1.0, the cavity has the Q-value of a pure dielectric, and when the cavity size increases, the Q-value constantly increases on a basis of the Q-value of the pure dielectric, the Q-value of the higher-order mode is greater than the Q-value of the base mode; and when the ratio increases to the conversion point 1, the Q-value of an original higher-order mode is approximate to a new Q-value of the base mode.

After the ratio enters the conversion point 1, the Q-value of the base mode is greater than the Q-value of the higher-order mode under a condition of keeping the resonance frequency of the base mode unchanged. With an increase of the ratio, as sizes of the dielectric block and cavity increase, the Q-value of the base mode increases, and the Q-value of the higher-order mode increases at a same time. When the ratio is approximate to the conversion point 2 of Q-value, the Q-value of the base mode is highest. When the ratio is between the conversion point 1 of the Q-value of the base mode and the conversion point 2 of the Q-value of the base mode, a frequency of the higher-order mode is sometimes far from and sometimes approximate to a frequency of the base mode with the variation of the ratio of the cavity to the dielectric resonance block between the conversion point 1 and the conversion point 2.

After the ratio enters the conversion point 2, the Q-value of the base mode is less than the Q-value of the higher-order mode. With an increase of the ratio, as the size of the dielectric resonance block decreases, the size of the cavity increase, the Q-value of the base mode constantly increases; and when the ratio is approximate to the conversion point 3, the Q-value of the base mode is approximate to the Q-value at the conversion point 2.

After the ratio enters the conversion point 3, the Q-value of the base mode increases with an increase of the ratio, the Q-value of the higher-order mode decreases with an increase of the ratio, the size of the dielectric resonance block decreases with an increase of the ratio, and the size of the cavity constantly increases. When the size of the cavity is approximate to the ¾ wavelength size of the cavity, as the size of the dielectric resonance block constantly decreases, the Q-value of the base mode decreases accordingly, and the frequency of the higher-order mode is sometimes far from and sometimes approximate to the frequency of the base mode with the increase of the ratio. A specific ratio of the conversion point is related to the dielectric constant and frequency of the dielectric resonance block and whether the dielectric resonator block has the single or composite dielectric constant.

A side length of the inner wall of the cavity and a side length of the dielectric resonance block can have equal or unequal size in three directions of axes X, Y and Z. When the cavity and the cub-like dielectric resonance block have equal sizes in three directions of axes X, Y and Z, a triple-mode is formed; when the cavity and the cub-like dielectric resonance block have slightly unequal sizes in three directions of axes X, Y and Z, a triple-mode is formed; when the size of the cavity body in one of directions of axes X, Y and Z and the corresponding single side size of the dielectric resonance block are different from the single side sizes in the other two directions, or a symmetrical single side sizes of any one of the cavity body and the dielectric resonance block are different from the single side sizes in the other two directions, a frequency of one of the triple modes changes and is different from a frequency of the other two modes. The greater a size difference is, the greater a frequency difference between one mode and the other two modes is. When a size in one direction is greater than sizes in the other two directions, the frequency drops on the original basis. When the size in one direction is smaller than the size in the other two directions, the frequency rises on an original basis, and thus, the triple-mode is gradually turned into a two-mode or a single-mode; when the cavity and the dielectric resonance block have greatly different sizes in three directions of axes X, Y and Z, and the symmetrical single side sizes in three directions of axes X, Y and Z are different, the frequency of the triple modes in the triple-mode are different; in a case where side length sizes in the three directions differ greatly, the base mode is a single-mode; in a case where a side length sizes in the three directions are slightly different, a frequency difference is not large; and although the frequency changes, a triple-mode state can still be maintained by the tuning device.

The coupling among the triple modes can adopt at least two coupling devices which are arranged in the cavity high-Q triple-mode dielectric resonance structure, and are used for changing the orthogonal properties of the electromagnetic field of the degenerate triple-mode in the cavity and are not in parallel arrangement; each coupling device includes cut corners or holes or corners and holes disposed beside the edges of the dielectric resonance block, or includes chamfers/cut corners disposed beside the edges of the cavity, or includes the cut corners or holes or corners and holes disposed beside the edges of the dielectric resonance block, and the chamfers/cut corners disposed beside the edges of the cavity, or includes tap wires or/sheets disposed on the non-parallel planes in the cavity; each cut corner is in the shape of a triangular prism or a cuboid or a sector; and each hole is circular, rectangular or polygonal. After corner cutting or perforating, under the condition of maintaining frequency, the side length of the dielectric resonance block increases, and the Q-value decreases slightly; the depth of the cut corner or the hole is of a through or partial cut corner/partial hole structure according to the required coupling quantity; and the size of the cut corner/chamfer/hole affects the coupling quantity. Coupling screws are arranged on coupling devices in the directions perpendicular or parallel to the cut corners or in the directions parallel to the holes or in the directions perpendicular or parallel to the cut corners and in the directions parallel to the holes; the coupling screw is made of metal, or the coupling screw is made of metal, the surface of which is electroplated with copper or sliver, or the coupling screw is made of a dielectric, or the coupling screw is made of a dielectric, the surface of which is metallized; and the coupling screw is in the shape of any one of a metal rod, a dielectric rod, a metal disk, a dielectric disk, the metal rod with the metal disk, the metal rod with the dielectric disk, the dielectric rod with the metal disk, and the dielectric rod with the dielectric disk.

The tuning frequency of the triple-mode in the X-axis direction is realized by adding debugging screws or tuning disks to the places where the field strength is concentrated on one side or two sides of the X-axis corresponding to the cavity to change the distance or capacitance; the tuning frequency of the triple-mode in the Y-axis direction is realized by adding debugging screws or tuning disks to the places where the field strength is concentrated on one side or two sides of the Y-axis corresponding to the cavity to change the distance or capacitance; and the tuning frequency of the triple-mode in the Z-axis direction is realized by adding debugging screws or tuning disks to the places where the field strength is concentrated on one side or two sides of the Z-axis corresponding to the cavity to change the distance or capacitance.

The Q-value conversion triple-mode structure of a dielectric resonator, the single-mode resonance cavity, the two-mode resonance cavity or the triple-mode resonance cavity are arbitrarily arranged and combined in different forms to form the required filters of different sizes; the filters have the functional characteristics that the filters include but are not limited to band pass filters, band stop filters, high pass filters, and low pass filters, and the filters form duplexers and multiplexers; and the coupling between any two resonance cavities formed by the arrangement and combination of the single-mode resonance cavity, the two-mode resonance cavity or the triple-mode resonance cavity is realized through the window size between the two resonance cavities under the condition that two resonance structures are parallel.

Some embodiments of the present disclosure has beneficial effects that the cavity high-Q triple-mode dielectric resonance structure is simple and convenient to use; by setting the ratio of the single side size of the inner wall of the metal cavity of the dielectric multimode structure to the single side size of the dielectric resonance block between 1.01 and 1.30, the resonance rod is cooperated with the cavity body to form the multi-mode structure, meanwhile a reversion of specific parameters is realized, and thus, the high Q-value is obtained at a smaller spacing between the resonance rod and a cavity body; further, some embodiments of the present disclosure discloses the filter with the high-Q triple-mode dielectric resonance structure; and compared with a traditional triple-mode filter, the insertion loss of the filter is reduced by the more than 30% under the premise of the same frequency and same volume. The magnetic fields of a frequency conversion multimode structure of a dielectric resonator formed by a cube-like dielectric resonance block, a dielectric support frame and the cavity body cover plate in three directions of axes X, Y and Z of the cavity body are mutually orthogonal and perpendicular to form three resonance modes that do not interfere with each other; and the frequency of the higher-order mode is converted into the frequency of the high-Q base mode to form coupling the among three magnetic fields. The strength of the coupling is adjusted to meet the different bandwidth requirements of the filter. When the two filters with the high-Q triple-mode dielectric structures are used in a typical 1800-MHz frequency filter, the volume of the filter is equivalent to the volume of six single cavities of an original cavity, and the volume is reduced by 40% on a basis of the original cavity filter, and the insertion loss can also be reduced by about 30%. As the volume is greatly reduced, processing man-hours and the plating area are reduced accordingly; although the dielectric resonance block is used, the cost of the dielectric resonance block is equivalent to the cost of the cavity; if the material cost of the dielectric resonance block can be greatly reduced, the cost advantage of this design will be more obvious; when there are more filter cavity bodies, even 3 triple-mode structures can be used, and advantages brought by the volume and performances are more obvious.

Simulation Embodiment 1

As shown in FIG. 1, the cavity high-Q multi-mode dielectric resonance structure includes a cavity body 1 and a cover plate 4, wherein a dielectric resonance block and six dielectric support frames are disposed in the cavity body 1, and the dielectric support frames are cylindrical.

Figure 2:
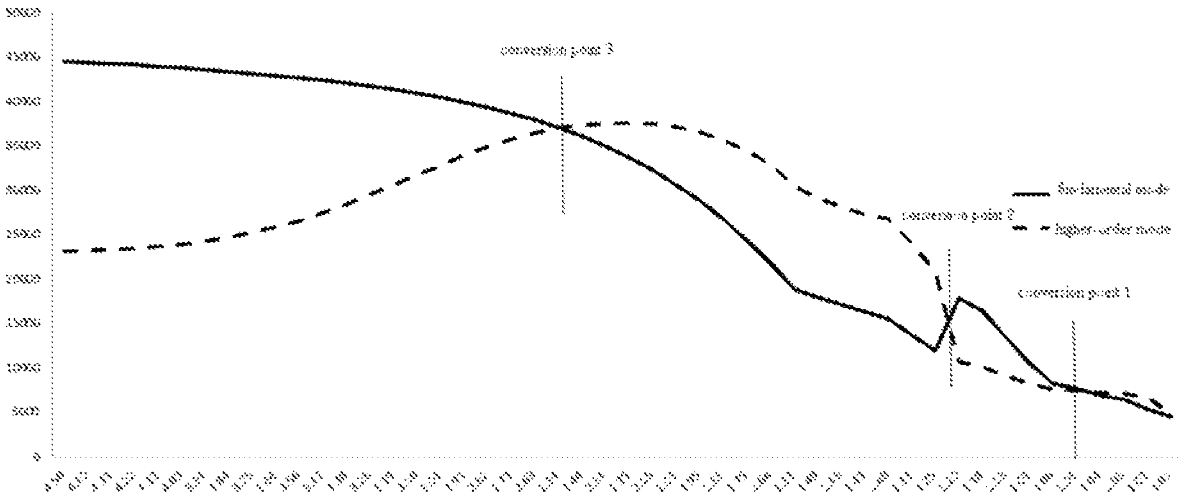
FIG. 2 illustrates a typical curve of a Q-value varying with a ratio of a side length of an inner wall of the cavity body to a side length of a dielectric resonance block of the present disclosure, wherein a x-coordinate is the ratio of the side length of the inner wall of the cavity body to the side length of the dielectric resonance block, and the y-coordinate is the Q-value.

In order to clarify the essence of the present disclosure more clearly, the present disclosure is further explained below with reference to data. In the following table data, by controlling the frequency of a base mode in the multi-mode resonance structure within a range of 1880 MHz±5 MHz, the dielectric constant of the dielectric resonance block is 35, and the Q×F of materials is 80,000; the side length of the single cavity is changed, and thus, the size of the dielectric resonance block varies accordingly in order to ensure the resonance frequency of the base mode, which is shown by the variation of the Q-value of the single cavity with A1/A2. See the table below for specific data. A curve of the Q-values of the base mode and the higher-order mode adjacent to the base mode varying with A1/A2=K and the schematic diagram of conversion points are shown in FIG. 2:

TABLE 1

| Side length of inner wall of cavity A1 (mm) | Side length of dielectric block A2(mm) | Ratio (A1\A2) | Q-value @ (1880 MHz ± 5 MHz) | Higher-order frequency | Higher-order frequency Q-value |
|---|---|---|---|---|---|
| 100 | 22.24 | 4.50 | 44486 | 1955 | 23034 |
| 92 | 22.32 | 4.12 | 43903 | 2070 | 23629 |
| 88 | 22.36 | 3.94 | 43544 | 2128 | 24264 |
| 84 | 22.41 | 3.75 | 43121 | 2182 | 25202 |
| 80 | 22.45 | 3.56 | 42624 | 2233 | 26551 |
| 76 | 22.49 | 3.38 | 42029 | 2278 | 28344 |
| 72 | 22.56 | 3.19 | 41295 | 2313 | 30585 |
| 68 | 22.6 | 3.01 | 40410 | 2343 | 32745 |
| 64 | 22.7 | 2.82 | 39277 | 2350 | 34911 |
| 60 | 22.8 | 2.63 | 37854 | 2364 | 36374 |
| 56 | 22.95 | 2.44 | 36014 | 2366 | 37277 |
| 52 | 23.15 | 2.25 | 33635 | 2355 | 37544 |
| 50 | 23.25 | 2.15 | 32226 | 2348 | 37414 |
| 48 | 23.4 | 2.05 | 30586 | 2334 | 37037 |
| 44 | 23.75 | 1.85 | 26699 | 2298 | 35590 |
| 40 | 24.4 | 1.64 | 21700 | 2228 | 32824 |
| 36 | 25.7 | 1.40 | 15506 | 2086 | 26724 |
| 34 | 27.1 | 1.25 | 11877 | 1936 | 20701 |
| 33 | 27.43 | 1.20 | 17746 | 1905 | 10650 |
| 32 | 27.2 | 1.18 | 16357 | 1949 | 10037 |
| 30 | 26.53 | 1.13 | 13367 | 2055 | 8998 |
| 28 | 25.67 | 1.09 | 10551 | 2183 | 8166 |

TABLE 1-continued

| Side length of inner wall of cavity A1 (mm) | Side length of dielectric block A2(mm) | Ratio (A1\A2) | Q-value @ (1880 MHz ± 5 MHz) | Higher-order frequency | Higher-order frequency Q-value |
|---|---|---|---|---|---|
| 26 | 24.56 | 1.06 | 8225 | 2337 | 7533 |
| 24 | 23.22 | 1.03 | 6340 | 2517 | 7012 |

The bolded part in table 1 is a data between 1.03-1.30. In this interval, it can be seen that the Q-value increases significantly, and the Q-value near the outside of this interval is obviously lower than the Q-value of this interval.

The ratio of the side length of the single cavity to the dielectric resonance block and the critical point curve are statistically completed under a premise that the frequency is 1880 MHz±5 MHz, and the dielectric constant is 35.

When A1/A2 enters a conversion point 1, in a frequency band used, the Q-value of the single cavity of the base mode becomes higher, and the Q-value of the single cavity of the higher-order mode adjacent to the base mode decreases;

When A1/A2 enters a conversion point 2, in the frequency band used, the Q-value of the single cavity of the base mode becomes lower, and the Q-value of the single cavity of the higher-order mode adjacent to the base mode becomes higher;

When A1/A2 enters a conversion point 3, in the frequency band used, the Q-value of the single cavity of the base mode increases with the increase of the size and the Q-value of the single cavity of the higher-order mode adjacent to the base mode decreases with the increase of the size;

When A1/A2 is between 1.0 and the conversion point 1, the Q-value of the higher-order mode adjacent to the base mode increases with the increase of the ratio, the Q-value of the single cavity of the base mode increases with the increase of the ratio, but the Q-value of the single cavity of the higher-order mode adjacent to the base mode is greater than the Q-value of the single cavity of the base mode; and the single cavities are coupled with other cavities to form a cavity filter with small volume and general performances.

When A1/A2 is between the conversion 1 and the conversion point 2, the Q-value of the higher-order mode adjacent to the base mode increases with the increase of the ratio, and the Q-value of the single cavity of the base mode increases with the increase of the ratio, but the Q-value of the single cavity of the base mode is greater than the Q-value of the single cavity of the higher-order mode adjacent to the base mode; and the single cavities are coupled with other cavities to form a cavity filter with small volume and higher performances.

When A1/A2 is between the conversion 2 and the conversion point 3, the Q-value of the higher-order mode adjacent to the base mode first increases and then decreases with the increase of the ratio, and the Q-value of the single cavity of the base mode first decreases and then increases with the increase of the ratio, but the Q-value of the single cavity of the base mode is less than the Q-value of the single cavity of the higher-order mode adjacent to the base mode; and the single cavities are coupled with other cavities to form a cavity multi-mode filter with larger volume and high performances.

When A1/A2 is between the conversion 3 and the maximum value, the Q-value of the higher-order mode adjacent to the base mode decreases with the increase of the ratio, and the Q-value of the single cavity of the base mode increases with the increase of the ratio, but the Q-value of the single cavity of the base mode is greater than the Q-value of the single cavity of the higher-order mode adjacent to the base mode; when the size of the cavity is approximate to the ¾ wavelength, the Q-value of the single cavity of the base mode decreases with the increases of the ratio; and the single cavities are coupled with other cavities to form a cavity filter with larger volume and higher performances.

Simulation Embodiment 2

Figures 3, 4:
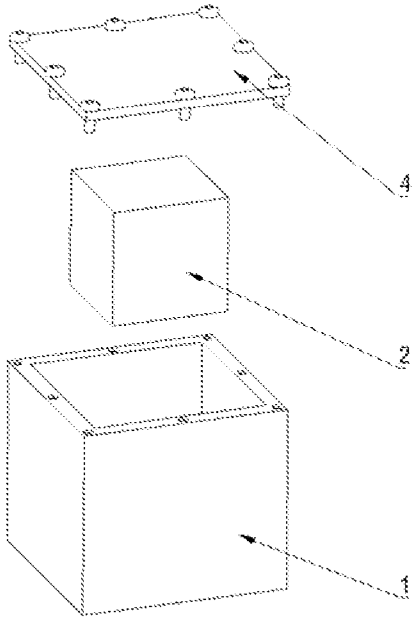
FIG. 3 illustrates a model structure diagram of a principle type cavity high-Q triple-mode dielectric resonance structure.
FIG. 4 illustrates a simulation result of a single cavity frequency and Q-value of the structure shown in FIG. 3.

As shown in FIG. 3, a cavity high-Q multi-mode dielectric resonance structure includes a cavity body 1 and a cover plate 4, wherein a dielectric resonance block is disposed in the cavity body 1. When the length, width and height of the inner wall of a typical single cavity are respectively 33 mm*33m*33 mm, the sizes of the dielectric resonance block (without the dielectric support frame, equivalently, air serves as the dielectric support frame) is 27.43 mm*27.43 mm*27.43 mm; when the dielectric constant of the dielectric resonance block is 35, and the Q×F of the materials is 80000, triple modes are formed, the frequency is 1881 MHz, and the Q-value reaches 17746.8. The specific simulation results are shown in FIG. 4.

| | Frequency | Q-value |
|---|---|---|
| Mode 1 | 1881.60 | 17746.8 |
| Mode 2 | 1881.93 | 17771.3 |
| Mode 3 | 1882.56 | 17797.2 |
| Mode 4 | 1905.31 | 10678.2 |

Simulation Embodiment 3

Figures 5, 6:
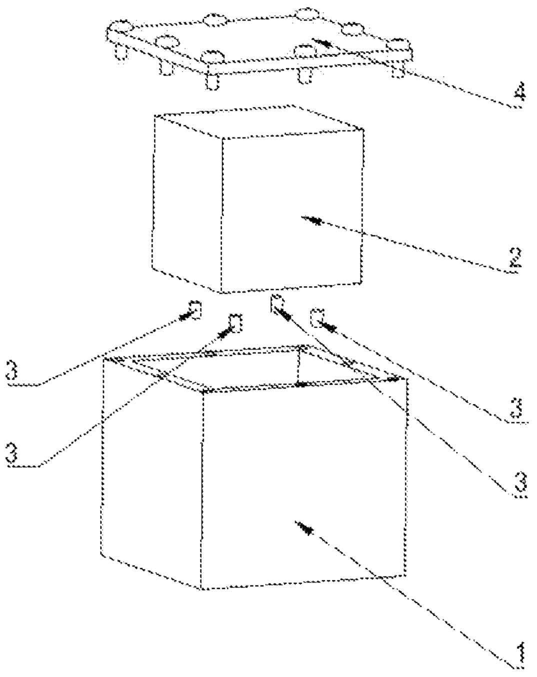
FIG. 5 illustrates an assembly diagram of the cavity high-Q triple-mode dielectric resonance structure including a plurality of coplanar supports.
FIG. 6 illustrates a simulation result of the single cavity frequency and Q-value of the structure shown in FIG. 5.

As shown in FIG. 5, a cavity high-Q multi-mode dielectric resonance structure includes a cavity body 1 and a cover plate 4, wherein a dielectric resonance block and a plurality of coplanar dielectric support frames are disposed in the cavity body 1. The dielectric support frames are cylindrical (or cuboid-shaped). When the length, width and height of an inner wall of the typical single cavity are respectively 33 mm*33m*33 mm, the sizes of the dielectric resonance block (with the dielectric support frames having the diameters of 2 mm, and when the dielectric constant is 1.06, the loss angle tangent is 0.0015) are 27.43 mm×27.43 mm×27.43 mm; when the dielectric constant of the dielectric resonance block is 35 and the Q×F of the materials is 80000, triple modes are formed, the frequency is 1881 MHz, and the Q-value reaches 17645. The specific simulation results are shown in FIG. 6.

| | Frequency | Q-value |
|---|---|---|
| Mode 1 | 1885.20 | 17645.1 |
| Mode 2 | 1885.27 | 17452.1 |

-continued

| | Frequency | Q-value |
|---|---|---|
| Mode 3 | 1885.34 | 17770.4 |
| Mode 4 | 19005.27 | 10672.9 |

Simulation Embodiment 4

Figures 7, 8:
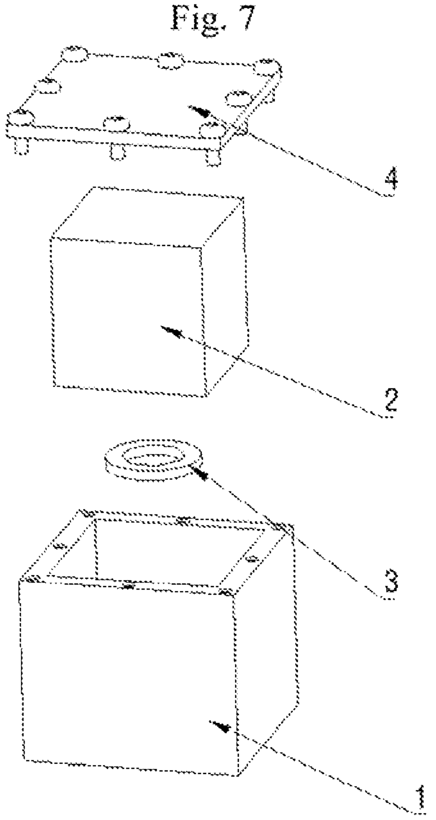
FIG. 7 illustrates an assembly drawing of a cavity high-Q triple-mode dielectric resonance structure including a single dielectric support frame.
FIG. 8 illustrates a simulation result of the single cavity frequency and Q-value of the structure shown in FIG. 7.

As shown in FIG. 7, a cavity high-Q multi-mode dielectric resonance structure includes a cavity body 1 and a cover plate 4, wherein a dielectric resonance block and a single dielectric support frame are disposed in the cavity body 1. The dielectric support frame is annular. When the length, width and height of the inner wall of the typical single cavity are respectively 33 mm*33m*33 mm, the sizes of the dielectric resonance block (with the dielectric support frame having the outer diameter of 7 mm and the inner diameter of 3.2, and when the dielectric constant is 9.8, the Q*F of the materials is 100000) are 27.83 mm×27.83 mm×27.83 mm; when the dielectric constant of the dielectric resonance block is 35 and the Q*F of the material is 80000, triple modes are formed, the frequency is 1880 MHz, and the Q-value reaches 17338.3. The specific simulation results are shown in FIG. 8.

| | frequency | Q-value |
|---|---|---|
| Mode 1 | 1879.50 | 17338.3 |
| Mode 2 | 1881.11 | 17017.3 |
| Mode 3 | 1881.20 | 17022.8 |
| Mode 4 | 1901.85 | 10597.5 |

Simulation Embodiment 5

Figures 9, 10:
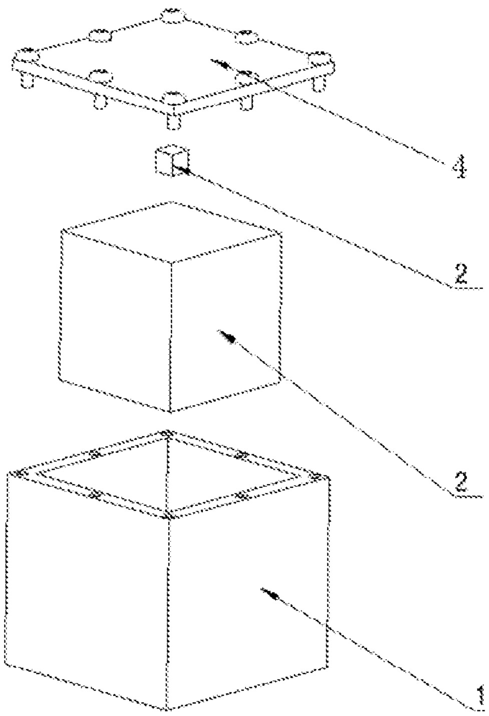
FIG. 9 illustrates an assembly drawing of a nested cavity high-Q triple-mode dielectric resonance structure.
FIG. 10 illustrates a simulation result of the single cavity frequency and Q-value of the structure shown in FIG. 9.

As shown in FIG. 9, a cavity high-Q multi-mode dielectric resonance structure includes a cavity body 1 and a cover plate 4, wherein a dielectric resonance block is disposed in the cavity body 1 and is made of mediums having different dielectric constants; and high dielectric constant dielectrics are nested in low dielectric constant dielectrics. When the length, width and height of the inner wall of the typical single cavity are respectively 33 mm*33m*33 mm, the sizes of the dielectric resonance block are 27.46 mm×27.46 mm×27.46 mm; when the dielectric constant of the dielectric block is 35 and the Q*F of the materials is 80000, the dielectric constant of the dielectric block nested in the middle of the dielectric is 68, and the Q*F of the material is 12000, the filled volume is 2 mm*2 mm*2 mm, triple modes are formed, the frequency is 1881 MHz, and the Q-value reaches 17635.8; and the specific simulation results are shown in FIG. 10.

| | Frequency | Q-value |
|---|---|---|
| Mode 1 | 1881.67 | 17635.9 |
| Mode 2 | 1881.90 | 17650.3 |
| Mode 3 | 1882.32 | 17671.7 |
| Mode 4 | 1906.14 | 10702.8 |

Simulation Embodiment 6

Figure 11:
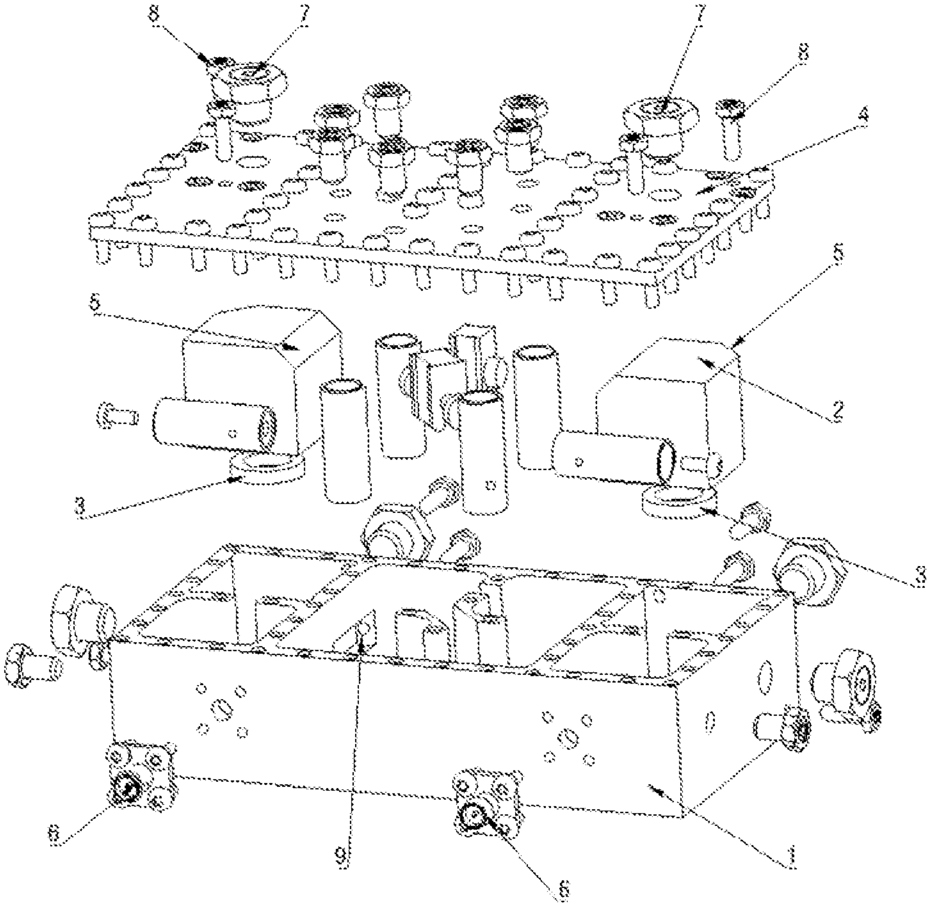
FIG. 11 illustrates an assembly diagram of a filter including the cavity high-Q triple-mode dielectric resonance structure, wherein triple modes are coupled by cutting edges, and the dielectric resonance block is realized by adopting a circular dielectric support frame.

A filter comprising the cavity high-Q multi-mode dielectric resonance structure includes a cavity body 1, a cover plate 4, and input/output structures 6, wherein the cavity body is internally provided with a cavity similar to a metal cavity filter, a metal resonance rod, and a tuning screw 7; and a coupling window or a boom/boom seat and a coupling screw are disposed in the cavity. In particular, the filter is provided with at least one cavity high-Q triple-mode structure; dielectric resonance blocks are disposed in the cavity of the cavity high-Q triple-mode structure and are supported by annular dielectrics; and the multi-mode coupling between the dielectric resonance blocks is realized by cutting the edges. A typical 12-cavity 1.8-GHz triple-mode cavity high-Q dielectric filter is shown in FIG. 11. Six metal single cavities and two high-Q triple-mode dielectric resonance structures are adopted in the filter to form three inductive cross coupling and three capacitive cross coupling.

Typical performance achieved:

pass band frequency of 1805 MHz-1880 MHz, suppression greater than −108 dBm@1710-1785 MHz and −108 dBm@1920-2000 MHz, volume of 129 mm*66.5 mm*35 mm.

Figure 12:
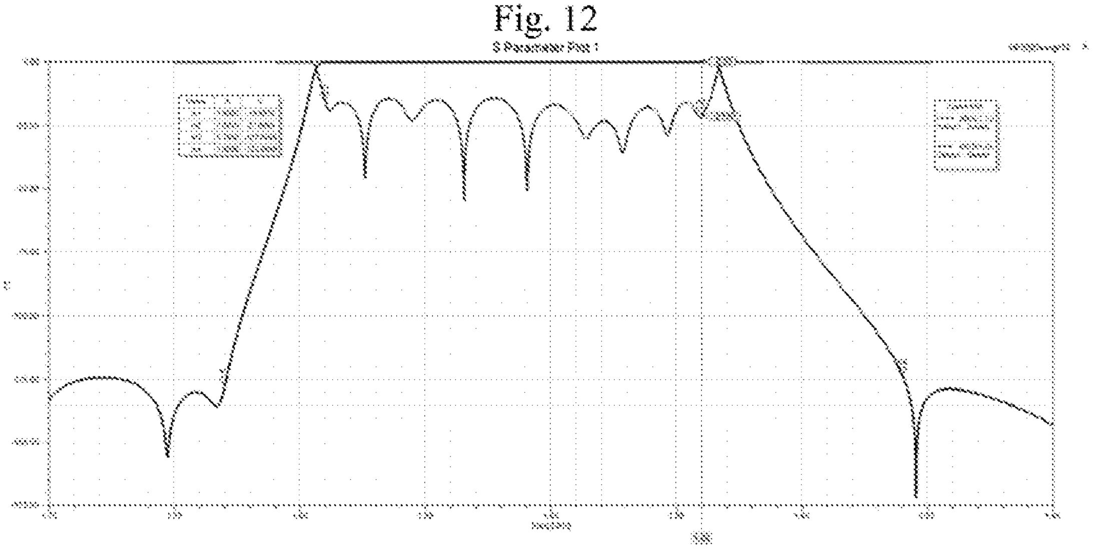
FIG. 12 illustrates a simulation curve corresponding to the filter shown in FIG. 11.
Figure 13:
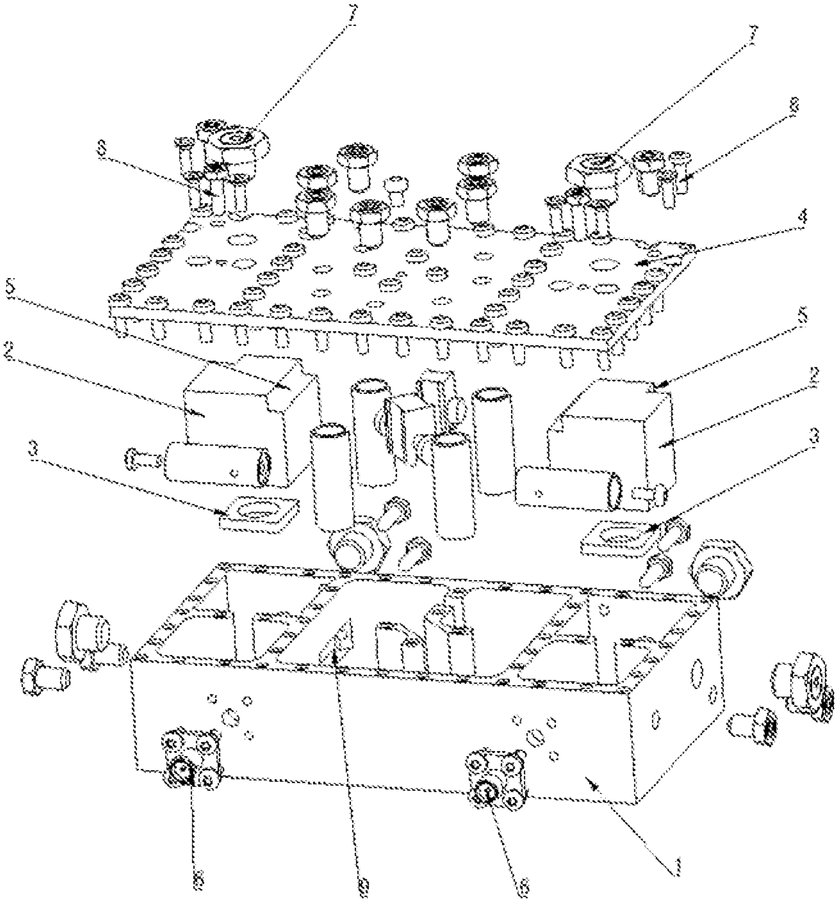
FIG. 13 illustrates an assembly diagram of a filter in some embodiments including the cavity high-Q triple-mode dielectric resonance structure, wherein triple modes are coupled by cutting right angles (steps), and the dielectric resonance block is realized by adopting square loop-shaped dielectric support frames.

Refer to FIG. 12 for the specific simulation curve.

Simulation Embodiment 7

In some embodiments, A filter including the cavity high-Q multi-mode dielectric resonance structure includes a cavity body 1, a cover plate 4, and input/output structures 6, wherein the cavity is internally provided with a cavity similar to a metal cavity filter, a metal resonance rod, and a tuning screw 7; and a coupling window or a boom/boom seat and a coupling screw are disposed in the cavity. In particular, the filter is provided with at least one cavity high-Q triple-mode structure; dielectric resonance blocks are arranged in the cavity of the cavity high-Q triple-mode structure; the dielectric resonance blocks are supported by square loop-shaped dielectrics; and the multi-mode coupling between the dielectric resonance blocks is realized by cutting the edges (steps). A typical 12-cavity 1.8-GHz triple-mode cavity high-Q dielectric filter is shown in FIG. 11. Six metal single cavities and two high-Q triple-mode dielectric resonance structures are adopted in the filter to form three inductive cross coupling and three capacitive cross coupling.

Typical performance achieved:

pass band frequency of 1805 MHz-1880 MHz, minimum point insertion loss of about 0.52 dB, suppression of greater than-108 dBm@1710-1785 MHz and-108 dBm@1920-2000M Hz, volume of 129 mm*66.5 mm*35 mm.

Figure 14:
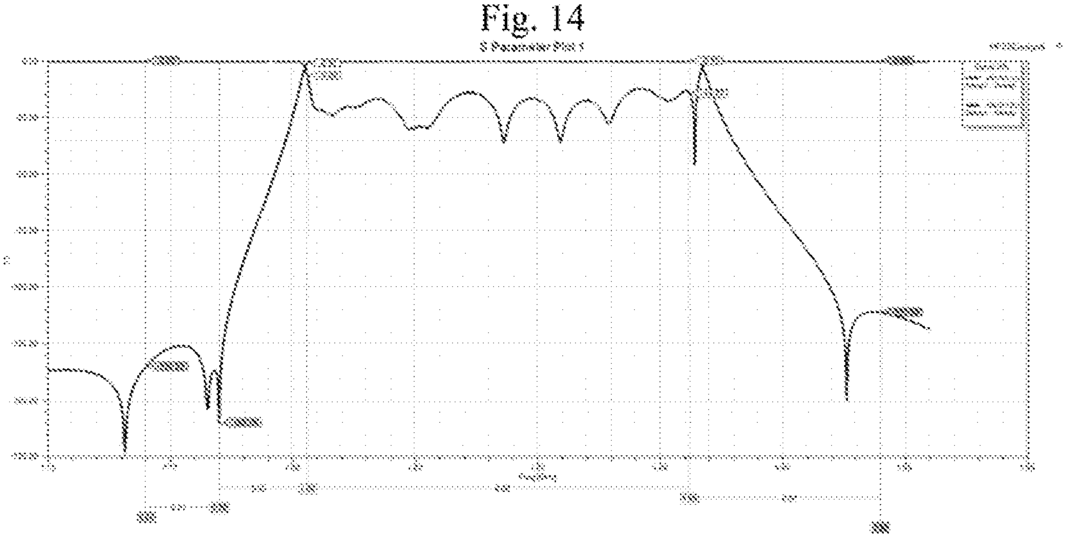
FIG. 14 illustrates a simulation curve corresponding to the filter in some embodiments shown in FIG. 13.
Figure 15:
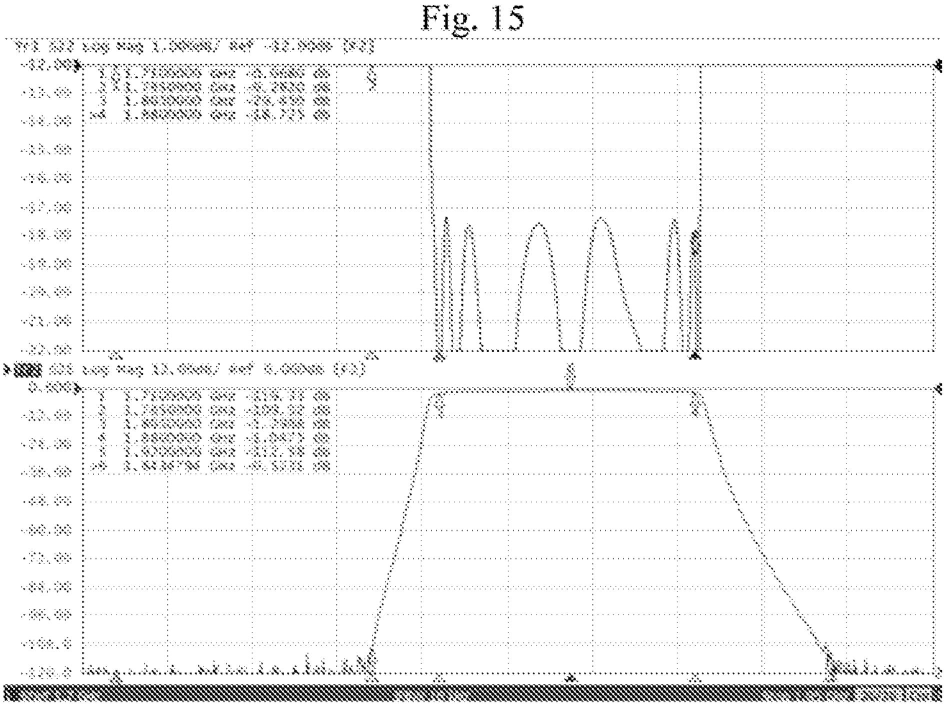
FIG. 15 illustrates a S parameter testing curve corresponding to the filter in some embodiments shown in FIG. 13.
Figure 16:
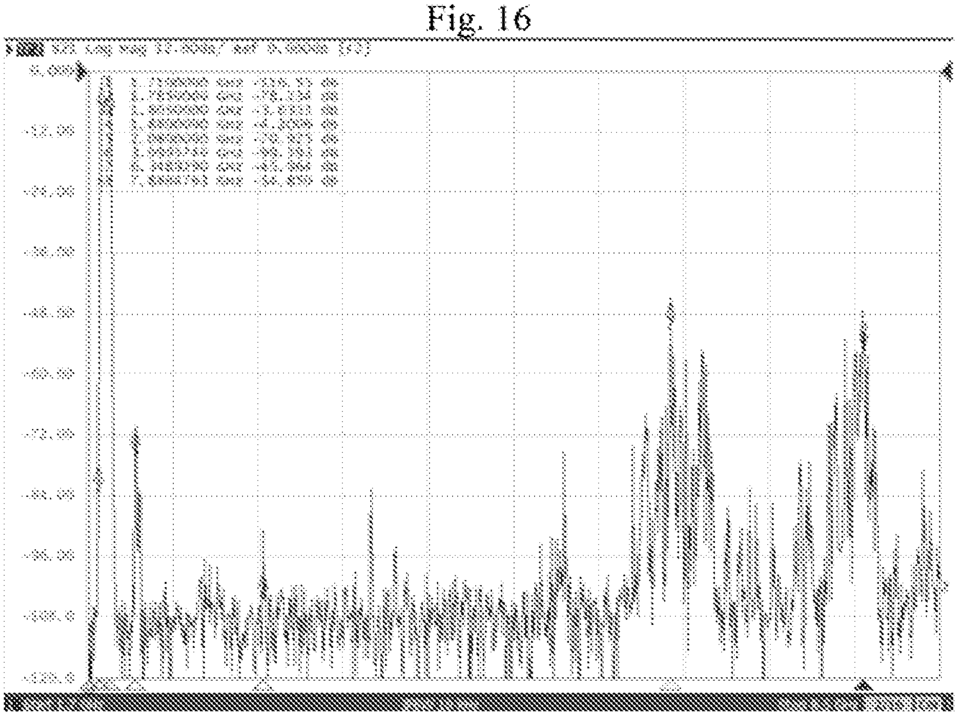
FIG. 16 illustrates a test curve of harmonic response within 8.5 GHz of the filter in some embodiments shown in FIG. 13.

Refer to FIG. 14 for the specific simulation curve, FIG. 15 for the real object S-parameter test curve, and FIG. 16 for the harmonic response curve of 8.5 GHz.

The simulation results of single cavities of the traditional TE-mode dielectric filters and TM-mode dielectric filters having the same volume and frequency, and ¾-wavelength metal single cavities having the same frequency are as follows:

Comparative Example 1

Single Cavity of TE-Mode Dielectric Resonator

Simulation conditions: single cavity 33*33*33, support column ER9.8, radius r1=3.5 mm, height 9 mm, dielectric block ER43, QF=43000, radius 14.3 mm, height 15 mm, F=1880.

Simulation result: the Q-value of the single cavity is 11022 when the frequency is 1882.6 MHz.

| | Frequency | Q-value |
|---|---|---|
| Mode 1 | 1882.61 | 11022.9 |
| Mode 2 | 2167.64 | 14085.4 |
| Mode 3 | 2167.67 | 14067.6 |
| Mode 4 | 2172.50 | 18931.7 |

Comparative Example 2

Single Cavity of TM-Mode Dielectric Resonator

Simulation conditions: single cavity 33*33*33, dielectric block ER35, QF=80000, radius 5.8 mm, inner diameter 5.8−3=2.8 mm, height 33 mm, F=1880.

Simulation result: the Q-value is 7493 when the frequency is 1878.5 MHz.

| | Frequency | Q-value |
|---|---|---|
| Mode 1 | 1878.50 | 7493.67 |
| Mode 2 | 3157.94 | 9161.01 |
| Mode 3 | 3157.98 | 9160.74 |
| Mode 4 | 32276.4 | 12546.6 |

Comparative Example 3

¾ Wave Length Cavity

Simulation conditions: single cavity 112.6*112.6*1126, dielectric block ER35, QF=80000, radius 5.8 mm, inner diameter 5.8−3=2.8 mm, height 33 mm, F=1880.

Simulation result: the Q-value is 20439 when the frequency is 1880 MHz.

| | Frequency | Q-value |
|---|---|---|
| Mode 1 | 1882.81 | 20439.6 |
| Mode 2 | 1882.95 | 20400.8 |
| Mode 3 | 1882.98 | 20444.3 |
| Mode 4 | 2306.87 | 16992.2 |

Comparative Example 4

1800-MHz 12-Cavity Filter

Six metal single cavities and two high-Q triple-mode dielectric structures are adopted to form two inductive cross coupling and four capacitive cross coupling.

Typical performance achieved:

Pass band frequency: 1805 MHz-1880 MHz

Insertion loss: less than-0.9 dB;

A suppression for 1710-1785 MHz: greater than 120 dBm;

Volume: 129 mm*66.5 mm*35 mm;

Performance and pass band frequency by using 12 metal single cavities: 1805 MHz-1880 MHz Insertion loss: less than −1.3 dB A suppression for 1710-1785 MHz: greater than 120 dBm Volume: 162 mm*122 mm*40 mm

BRIEF SUMMARY

| | Volume of single cavity | Frequency | Q-value |
|---|---|---|---|
| Dielectric Q-value conversion triple-mode | 33 mm * 33 mm * 33 mm | 1880 MHz | 17746 |
| TE single mode | 33 mm * 33 mm * 33 mm | 1880 MHz | 11022 |
| TM single mode | 33 mm * 33 mm * 33 mm | 1880 MHz | 7493 |
| 3/4 wavelength cavity | 112.6 mm * 112.6 mm * 112.6 mm | 1880 MHz | 20439 |

From the above table, it can be obtained that the Q-value ratio of the dielectric Q-value conversion triple-mode and TE single mode under the same single-cavity volume and frequency is 17746/11022=1.61. The Q-value ratio of TE single mode and TM single mode at the same single cavity volume and frequency is 11022/7493=1 47.

From the comparison of the embodiments 1-5 and the comparative examples 1-3, it can be seen that:

1. When the single cavity of the triple-mode dielectric conversion structure is simulated, and the Q-value conversion is generated, the Q-value is obviously higher than the Q-value before conversion under a premise that the single cavity volumes are little different.

2. When the single cavity of the triple-mode dielectric conversion structure is simulated, the Q-value is obviously higher than the Q-value of the TE dielectric single mode structure and the TM dielectric single mode structure under a same frequency and same volume.

| | Pass band frequency | Insertion loss | volume |
|---|---|---|---|
| Metal single-mode filter | 1805-1880 MHz | 1.3 dB | 162 mm * 122 mm * 40 mm |
| High-Q triple-mode dielectric filter | 1805-1880 MHz | 0.9 dB | 129 mm * 66.5 mm * 35 mm |

From the comparison of the embodiments 1-7 and the comparative example 4, it can be seen that: when the ratio of the side length of the single cavity to the side length of the cube-like dielectric resonance block is between 1.03-1.30 of the present disclosure, that is, between the conversion point 1 and the conversion point 2, the Q-value is converted and increased, the Q-value is increased by more than 30% in comparison with the triple-mode single cavity without the range of the side length ratio; compared with the traditional TE dielectric single mode filters and TM dielectric single mode filters, the Q-value is significantly improved under the same volume and frequency; and the dielectric resonator applied to the filter has very obvious triple-mode volume and performance advantages. Furthermore, in a case where the single cavity volume is small, the Q value of a high-Q multi-mode dielectric resonance structure of the cavity is significantly higher than the Q value of the other forms of single cavity. The high-Q triple-mode dielectric resonance structure reduces the filter volume by more than 30%. Meanwhile, the loss of the filter is reduced by 30%, and when the performance of the high-Q triple-mode dielectric resonance structure filter is the same as that of the filter known to inventors, the volume is significantly reduced by more than 50% relative to a cavity filter known to inventors.

Some embodiments of the present disclosure is aimed to provide a dielectric resonator Q-value conversion triple-mode structure in order to overcome the shortcomings of the art known to inventors, which can reduce an overall insertion loss of the filter, and realizes higher-order Q-value conversion by using the size ratio of a single cube-like dielectric block and a hollow cube-like dielectric resonance block to the inner wall of the cavity so as to meet the requirements of the cavity filter for higher Q-values and smaller volumes.

It should be understood that the above are only specific embodiments of the present disclosure, but the protection scope of the present disclosure is not limited to this. Changes or replacements which can be easily thought of by those skilled in the art within the technical scope disclosed by the present disclosure shall be covered within the protection scope of the present disclosure.

What is claimed is:

1. A cavity high-Q triple-mode dielectric resonance structure applied to a filter, comprising a cavity with a dielectric resonance block and a dielectric support frame disposed inside, and a cover plate, wherein, the dielectric resonance block is of a cube-like solid structure; the dielectric support frame is respectively connected with the dielectric resonance block and an inner wall of the cavity; the dielectric resonance block and the dielectric support frame form a triple-mode dielectric resonance rod; a dielectric constant of the dielectric support frame is less than a dielectric constant of the dielectric resonance block;

a ratio K of the size of a single side of the inner wall of the cavity and the size of a corresponding single side of the dielectric resonance block is as follows: when K is greater than or equal to a conversion point 1 and is less than or equal to a conversion point 2, a Q-value of a higher-order mode adjacent to a base mode of the triple-mode dielectric resonance structure is converted into a Q-value of the base mode of the triple-mode dielectric resonance structure, a resonance frequency of the base mode after conversion is equal to a resonance frequency of the base mode before conversion, a Q-value of the base mode after conversion is greater than a Q-value of the base mode before conversion, and a Q-value of the higher-order mode adjacent to the base mode after conversion is less than a Q-value of the higher-order mode adjacent to the base mode before conversion;

the triple-mode dielectric resonance structure is internally provided with a coupling structure for changing orthogonal properties of electromagnetic field of a degenerate triple-mode in the cavity;

and the triple-mode dielectric resonance structure is internally provided with a frequency tuning device for changing tuning frequency of the degenerate triple-mode in the cavity.

2. The cavity high-Q triple-mode dielectric resonance structure as claimed in claim 1, wherein, a value of the conversion point 1 and a value of the conversion point 2 both vary according to different resonance frequencies of the base mode of the dielectric resonance block, a dielectric constant of the dielectric resonance block, and a dielectric constant of the support frame.

3. The cavity high-Q triple-mode dielectric resonance structure as claimed in claim 1, wherein, when the resonance frequency of the base mode of the dielectric resonance block after conversion remains unchanged, a Q-value of the triple-mode dielectric resonance structure is related to the ratio K, the dielectric constant of the dielectric resonance block and the size of the dielectric resonance block.

4. The cavity high-Q triple-mode dielectric resonance structure as claimed in claim 1, wherein, when the ratio K increases from 1.0 to a maximum, the ratio K has triple Q-value conversion points in a variation range, and each Q-value conversion point enables the Q-value of the base mode and the Q-value of the higher-order mode adjacent to the base mode to be converted; when the Q-value of the base mode is lower than the Q-value of the higher-order mode adjacent to the base mode, the Q-value of the higher-order mode adjacent to the base mode is converted into the Q-value of the base mode, and the Q-value of the base mode is higher than the Q-value of the base mode before conversion; and when the Q-value of the base mode is higher than the Q-value of the higher-order mode adjacent to the base mode, the Q-value of the higher-order mode adjacent to the base mode is converted into the Q-value of the base mode, and the Q-value of the base mode is lower than the Q-value of the base mode before conversion.

5. The cavity high-Q triple-mode dielectric resonance structure as claimed in claim 4, wherein, in four regions formed by a starting point, an ending point and triple Q-value conversion points of the ratio K, the Q-value of the base mode and the Q-value of the higher-order mode adjacent to the base mode gradually vary with a variation of a size of a cavity body and a size of the dielectric resonance block, and requirements for applications of different regions in the filter are different.

6. The cavity high-a triple-mode dielectric resonance structure as claimed in claim 1, wherein, when the cavity and the dielectric resonance block have equal sizes in axes X, Y and Z, a degenerate triple-mode is formed, and the degenerate triple-mode is coupled with other single cavities to form a band-pass filter;

when the cavity and the dielectric resonance block have slightly unequal sizes in axes X, Y and Z, an orthogonal-like triple-mode resonance is formed; if the orthogonal-like triple-mode is still coupled with other cavities to form the band-pass filter, sizes are all acceptable; if the orthogonal-like triple-mode is not coupled with other cavities to form the band-pass filter, the sizes are unacceptable;

and when the differences of the sizes of the cavity and the dielectric resonance block in axes X, Y and Z are greatly different, the degenerate triple-mode or the orthogonal-like triple-mode is not formed, but three modes with different frequencies are formed, thus, the three modes with different frequencies are not coupled with other cavities to form the band-pass filter, and the sizes are not acceptable.

7. The cavity high-Q triple-mode dielectric resonance structure as claimed in claim 6, wherein, the cavity high-Q triple-mode dielectric resonance structure forms the degenerate triple-mode in axes X, Y and Z; a tuning frequency of the degenerate triple-mode in the X-axis direction is realized by adding debugging screws or tuning disks to places where a field strength is concentrated on one side or two sides of the X-axis corresponding to the cavity to change a distance or capacitance; a tuning frequency of the degenerate triple-mode in the Y-axis direction is realized by adding debugging screws or tuning disks to places where a field strength is concentrated on one side or two sides of the Y-axis corresponding to the cavity to change the distance or capacitance; and a tuning frequency of the degenerate triple-mode in the Z-axis direction is realized by adding debugging screws or tuning disks to places where a field strength is concentrated on one side or two sides of the Z-axis corresponding to the cavity to change the distance or capacitance.

8. The cavity high-Q triple-mode dielectric resonance structure as claimed in claim 6, wherein, the cavity high-Q triple-mode dielectric resonance structure forms the degenerate triple-mode in axes X, Y and Z; a frequency of the degenerate triple-mode is adjusted by changing a dielectric constant; a surface of the dielectric resonance block, an inner wall of the cavity body, an inner wall of the cover plate, or an bottom of an tuning screw is pasted with dielectric constant thin films of different shapes and thicknesses; the dielectric constant thin films are made of ceramic dielectric and ferroelectric materials;

the tuning screw or a tuning disk is made of metal, or the tuning screw or the tuning disk is made of metal and a surface of the metal is electroplated with copper or silver; or the tuning screw or disk is made of medium; or the tuning screw or the tuning disk is made of a surface metallized dielectric;

and the tuning screw is in a shape of any one of a metal rod, a dielectric rod, a metal disk, a dielectric disk, a metal rod with a metal disk, a metal rod with a dielectric disk, a dielectric rod with a metal disk, and a dielectric rod with a dielectric disk.

9. The cavity high-Q triple-mode dielectric resonance structure as claimed in claim 1, wherein, the cavity high-Q triple-mode dielectric resonance structure is internally provided with at least two coupling devices which are used for changing the orthogonal properties of the electromagnetic field of the degenerate triple-mode in the cavity and are not in parallel arrangement;

each of the at least two coupling device comprises cut corners/chamfers/grooves disposed on edges of the dielectric resonance block;

or comprises chamfers/cut corners disposed at inner corners of the cavity;

or comprises the cut, corners/chamfers/grooves disposed beside edges of the dielectric resonance block and chamfers/cut corners beside edges of the cavity;

or comprises tap wires or/sheets disposed on non-parallel planes in the cavity;

each of the cut corners is in a shape of a triangular prism or cuboid or a sector; after corner cutting, under a condition of maintaining frequency, a side length of the dielectric resonance block increases, and a Q-value decreases slightly;

a depth of each of the cut corners or a hole is of a through or partial cut corner/partial hole structure according to a required coupling quantity;

the size of each of the cut corners/chamfers/holes affects a magnitude of a coupling quantity;

coupling screws are disposed on coupling devices in directions perpendicular or parallel to the cut corners; the coupling screw is made of metal; or the coupling screw is made of metal, a surface of which is electroplated with copper or sliver; or the coupling screw is made of medium; or the coupling screw is made of medium, a surface of which is metallized;

and the coupling screw is in a shape of any one of a metal rod, a dielectric rod, a metal disk, a dielectric disk, a metal rod with a metal disk, and a metal rod with a dielectric disk, a dielectric rod with a metal disk, and a dielectric rod with a dielectric disk.

10. The cavity high-Q triple-mode dielectric resonance structure as claimed in claim 1, wherein, the cavity high-Q triple-mode dielectric resonance structure is internally provided with at least two coupling devices for changing orthogonal properties of the electromagnetic field of the degenerate triple-mode in the cavity and are not in parallel arrangement;

each of the at least two coupling device comprises holes/grooves disposed on end surfaces of the dielectric resonance block, center lines of the holes or the grooves are parallel to edges perpendicular to the end surfaces with the holes or the grooves of the dielectric resonance block;

or comprises chanthers/cut corners disposed at inner corners of the cavity, or comprises holes/grooves disposed on an end surfaces of the dielectric resonance block and the chambers/cut corners disposed besides edges of the cavity, or comprises tap wires or/sheets disposed on non-parallel planes in the cavity;

a depth of each of the holes is of a through or/partial hole structure according to a required coupling quantity;

the size of each of the holes affects a magnitude of, a coupling quantity;

each of the holes/grooves is circular, rectangular or polygonal; after the holes/grooves are formed, under a condition of maintaining frequency, a side length of the dielectric resonance block increases, and a Q-value slightly decreases;

coupling screws are disposed on coupling devices in directions parallel to the holes; the coupling screw is made of metal; or the coupling screw is made of metal, a surface of which is electroplated with copper or sliver; or the coupling screw is made of medium; or the coupling screw is made of medium, a surface of which is the metallized;

and the coupling screw is in a shape of any one of a metal rod, a dielectric rod, a metal disk, a dielectric disk, a metal rod with a metal disk, and a metal rod with a dielectric disk, a dielectric rod with a metal disk, and a dielectric rod with a dielectric disk.

11. The cavity high-a triple-mode dielectric resonance structure as claimed in claim 1, wherein, the cavity is cube-like; in order to realize coupling among triple modes, cut sides for realizing the coupling among the triple modes are processed on any two adjacent surfaces of the cavity under a premise that the size of the dielectric resonance block is not changed; sizes of the cut sides are related to a required coupling quantity; coupling between the, two modes in the triple-mode coupling is realized by the cut sides of the cavity; a remaining coupling is realized by cutting corners at two adjacent sides of the cavity; a wall is not broken when the corners are cut at the adjacent sides of the cavity; corner cutting surfaces need to be completely sealed with the cavity; a surface of the cavity is electroplated with copper or silver; the cavity is made of metal or nonmetal materials; and when the cavity is made of the nonmental materials, an inner wall of the cavity is electroplated with conductive materials.

12. The cavity high-Q triple-mode dielectric resonance structure as claimed in claim 1, wherein, when the cavity is cube-like, the dielectric resonance block and the dielectric support frame are disposed in any one of axial directions of the cavity, and a center of the dielectric resonance block coincides with or approaches a center of the cavity.

13. The cavity high-Q triple-mode dielectric resonance structure as claimed in claim 1, wherein, the dielectric constant of the dielectric support frame is similar to a dielectric constant of air; the dielectric support frame has no effect on the triple-mode resonance frequency; the dielectric support frame supports any single surface of the dielectric resonance block, or supports six surfaces, or different two surfaces, three surfaces, four surfaces and five surfaces in different combinations; each surface is supported by single dielectric support frame or a plurality of dielectric support frames; and one or a plurality of dielectric support frames are disposed on different surfaces according to the needs.

14. The cavity high-Q triple-mode dielectric resonance structure as claimed in claim 1, wherein, the dielectric constant of the dielectric support frame is greater than the dielectric constant of air and is less than the dielectric constant of the dielectric resonance block; in order to maintain a frequency of the original triple-mode, a size of the dielectric support frame corresponding to the axial direction of the dielectric resonance block is slightly reduced; the dielectric support frame supports any single surface of the dielectric resonance block, or supports six surfaces, or different two surfaces, three surfaces, four surfaces and five surfaces in different combinations; the surface without the support frame, of the dielectric resonance block is air; an air surface is arbitrarily combined with the dielectric support frame; each surface is supported by a single dielectric support frame or a plurality of dielectric support frames, or composite dielectric constant support frames comprising a plurality of layers of different dielectric constant dielectric materials; the single-layer and multiple-layer dielectric material support frames are arbitrarily combined with a cube-like dielectric block; one or a plurality of support frames is disposed on different surfaces according to the needs; and in order to maintain a frequency and Q-value of the triple-mode, the size of the dielectric support frame corresponding to the axial direction of the dielectric resonance block is slightly reduced.

15. The cavity high-Q triple-mode dielectric resonance structure as claimed in claim 13, wherein, a support combination of a single surface is used to support any one surface of the dielectric resonance block, especially a bottom surface or a load-bearing surface in a vertical direction;

a support combination of two surfaces comprises parallel surfaces such as upper and lower surfaces, front and rear surfaces, and left and right surfaces, also comprises non-parallel surfaces such as a top surface and a front surface, a top surface and a left surface, and a top surface and a right surface;

a support combination of three surfaces comprises three mutually perpendicular surfaces or two parallel surfaces and one non-parallel surface;

a support combination of four surfaces comprises two pairs of parallel surfaces or a pair of parallel surfaces and other two non-parallel surfaces;

a support combination of five surfaces comprises a support structure on other faces except any one surface of the front surface/rear surface/left surface/right surface/upper surface/ lower surface;

and a support combination of six surfaces comprises support structures of the front surface/rear surface/left surface/right surface/top surface/bottom surface.

16. The cavity high-Q triple-mode dielectric resonance structure as claimed in claim 1, wherein, a surface area of the dielectric support frame is less than or equal to a surface area of the dielectric resonance block; the dielectric support frame is a cylinder, a cube or a cuboid;

the dielectric support frame is of a solid structure or a hollow structure; the dielectric support frame being of the hollow structure comprises a single hole or a plurality of holes; each of the single hole or the plurality of holes is round, square, polygonal and arc;

the dielectric support frame is made of plastic, ceramic, or dielectric; or the dielectric support frame is air.

17. The cavity high-Q triple-mode dielectric resonance structure as claimed in claim 1, wherein, the dielectric support frame is connected with the dielectric resonance block by a manner of crimping, bonding or sintering; and the dielectric support frame and the inner wall of the cavity body are connected by fixing manners such as bonding, crimping, welding, sintering and bolts.

18. The cavity high-Q triple-mode dielectric resonance structure as claimed in claim 1, wherein, a radio frequency channel formed by coupling of radio frequency signals in directions of axes X, Y and Z of triple-mode causes loss and generates heat; and the dielectric resonance block is fully connected with the inner wall of the cavity through the dielectric support frame to guide heat into a cavity body for heat dissipation.

19. The cavity high-Q triple-mode dielectric resonance structure as claimed in claim 1, wherein, a frequency temperature coefficient of the dielectric resonance block is controlled by adjusting a ratio of dielectric materials, and is compensated according to a frequency deviation change of the filter under different temperature conditions.

20. The cavity high-Q triple-mode dielectric resonance structure as claimed in claim 19, wherein, the dielectric resonance block has a single dielectric constant or a composite dielectric constant; the dielectric resonance block with the composite dielectric constant is made of at least two materials with different dielectric constants; materials with different dielectric constants are combined by up and down, or left and right, or asymmetric or nested manners; when materials with different dielectric constants are nested in the dielectric resonance block, one layer of or a plurality of layers of materials with different dielectric constants are nested in the dielectric resonance block; the dielectric resonance block with the composite dielectric constant needs to meet a change variation rules of Q-value conversion points; when side cutting coupling is performed among triple modes of the dielectric resonance block, in order to maintain a required frequency, corresponding side lengths of two surfaces adjacent to cut sides are adjusted in parallel; the dielectric resonance block is made of ceramic or dielectric materials; and a surface of the dielectric resonance block is added with dielectric sheets with different thicknesses and different dielectric constants.

21. The cavity high-Q triple-mode dielectric resonance structure as claimed in claim 14, wherein, a support combination of a single surface is used to support any one surface of the dielectric resonance block, especially a bottom surface or a load-bearing surface in a vertical direction;

a support combination of two surfaces comprises parallel surfaces such as upper and lower surfaces, front and rear surfaces, and left and right surfaces, also comprises non-parallel surfaces such as a top surface and a front surface, a top surface and a left surface, and a top surface and a right surface;

a support combination of three surfaces comprises three mutually perpendicular surfaces or two parallel surfaces and one non-parallel surface;

a support combination of four surfaces comprises two pairs of parallel surfaces or a pair of parallel surfaces and other two non-parallel surfaces;

a support combination of five surfaces comprises a support structure on other faces except any one surface of the front surface/rear surface/left surface/right surface/upper surface/lower surface;

and a support combination of six surfaces comprises support structures of the front surface/rear surface/left surface/right surface/top surface/bottom surface.

22. A filter comprising the high-Q triple-mode dielectric resonance structure, comprising a cavity body, a cover plate and an input/output structure, and wherein, the cavity body is internally provided with at least one high-Q triple-mode dielectric resonance structure as claimed in claim 1;

the high-Q triple-mode dielectric resonance structure, a single-mode resonance structure, a two-mode resonance structure and a triple-mode resonance structure are combined in different forms to form filters of different volumes;

coupling between any two resonance cavities formed by an arrangement and combination of the high-Q triple-mode dielectric resonance structure, a single-mode resonance cavity, a two-mode resonance cavity, and a triple-mode resonance cavity is realized through a window size between the any two resonance cavities only under a condition that resonance rods in the two resonance cavities are parallel; the window size is determined according to the coupling quantity;

and the filters have functional characteristics that the filters comprise but are not limited to band pass filters, band stop filters, high pass filters, and low pass filters, and duplexers, multiplexers and combiners formed by the band pass filters, band stop filters, high pass filters, and low pass filters.

23. The filter comprising the high-Q triple-mode dielectric resonance structure as claimed in claim 22, wherein, a value of the conversion point 1 and a value of the conversion point 2 both vary according to different resonance frequencies of the base mode of the dielectric resonance block, a dielectric constant of the dielectric resonance block, and a dielectric constant of the support frame.

24. The filter comprising the high-Q triple-mode dielectric resonance structure as claimed in claim 22, wherein, when the resonance frequency of the base mode of the dielectric resonance block after conversion remains unchanged, a Q-value of the triple-mode dielectric resonance structure is related to the ratio K, the dielectric constant of the dielectric resonance block and'the size of the dielectric resonance block.

25. The filter comprising the high-Q triple-mode dielectric resonance structure as claimed in claim 22, wherein, when the ratio K increases from 1.0 to a maximum, the ratio K has triple Q-value conversion points in a variation range, and each Q-value conversion point enables the Q-value of the base mode and the Q-value of the higher-order mode adjacent to the base mode to be converted; when the Q-value of the base mode is lower than the Q-value of the higher-order mode adjacent to the base mode, the Q-value of the higher-order mode adjacent to the base mode is converted into the Q-value of the base mode, and the Q-value of the base mode is higher than the Q-value of the base mode before conversion; and when the Q-value of the base mode is higher than the Q-value of the higher-order mode adjacent to the base mode, the Q-value of the higher-order mode adjacent to the base mode is converted into the Q-value of the base mode, and the Q-value of the base mode is lower than the Q-value of the base mode before conversion.

26. The filter comprising the high-Q triple-mode dielectric resonance structure as claimed in claim 25, wherein, in four regions formed by a starting point, an ending point and triple Q-value conversion points of the ratio K, the Q-value of the base mode and the Q-value of the higher-order mode adjacent to the base mode gradually vary with a variation of a size of a cavity body and a size of the dielectric resonance block and requirements for applications of different regions in the filter are different.

27. The filter comprising the high-Q triple-mode dielectric resonance structure as claimed in claim 22, wherein, when the cavity and the dielectric resonance block have equal sizes in axes X, Y and Z, a degenerate triple-mode is formed, and the degenerate triple-mode is coupled with other single cavities to form a band-pass filter;

when the cavity and the dielectric resonance block have slightly unequal sizes in axes X, Y and Z, an orthogonal-like triple-mode resonance is formed; if the orthogonal-like triple-mode is still coupled with other cavities to form the band-pass filter, sizes are all acceptable; if the orthogonal-like triple-mode is not coupled with other cavities to form the band-pass filter, the sizes are unacceptable;

and when the differences of the sizes of the cavity and the dielectric, resonance block in axes X, Y and Z are greatly different, the degenerate triple-mode or the orthogonal-like triple-mode is not formed, but three modes with different frequencies are formed, thus, the three modes with different frequencies are not coupled with other cavities to form the band-pass filter, and the sizes are not acceptable.

28. The filter comprising the high-Q triple-mode dielectric resonance structure as claimed in claim 27, wherein, the cavity high-Q triple-mode dielectric resonance structure forms the degenerate triple-mode in axes X, Y and Z; a tuning frequency of the degenerate triple-mode in the X-axis direction is realized by adding debugging screws or tuning disks to places where a field strength is concentrated on one side or two sides of the X-axis corresponding to the cavity to change a distance or capacitance; a tuning frequency of the degenerate triple-mode in the Y-axis direction is realized by adding debugging screws or tuning disks to places where a field strength is concentrated on one side or two sides of the Y-axis corresponding to the cavity to change the distance or capacitance; and a tuning frequency of the degenerate triple-mode in the Z-axis direction is realized by adding debugging screws or tuning disks to places where a field strength is concentrated on one side or two sides of the Z-axis corresponding to the cavity to change the distance or capacitance.

29. The filter comprising the high-Q triple-mode dielectric resonance structure as claimed in claim 28, wherein, the cavity high-Q triple-mode dielectric resonance structure forms the degenerate triple-mode in axes X, Y and Z; a frequency of the degenerate triple-mode is acilusted by changing a dielectric constant; a surface of the dielectric resonance block, an inner wall of the cavity body, an inner wall of the cover plate, or an bottom of an tuning screw is pasted with dielectric constant thin films of different shapes and thicknesses; the dielectric constant thin films are made of ceramic dielectric and ferroelectric materials;

the tuning screw or a tuning disk is made of metal, or the tuning screw or the tuning disk is made of metal and a surface of the metal is electroplated with copper or silver; or the tuning screw or disk is made of medium; or the tuning screw or the tuning disk is made of a surface metallized dielectric;

and the tuning screw is in a shape of any one of a metal rod, a dielectric rod, a metal disk, a dielectric disk, a metal rod with a metal disk, a metal rod with a dielectric disk, a dielectric rod with a metal disk, and a dielectric rod with a dielectric disk.

30. The filter comprising the high-Q triple-mode dielectric resonance structure as claimed in claim 22, wherein, the cavity high-Q triple-mode dielectric resonance structure is internally provided with at least two coupling devices which are used for changing the orthogonal properties of the electromagnetic field of the degenerate triple-mode in the cavity and are not in parallel arrangement;

each of the at least two coupling device comprises cut corners/chamfers/grooves disposed on edges of the dielectric resonance block, or comprises chamfers/cut corners disposed at inner corners of the cavity, or comprises the cut corners/chamfers/grooves disposed beside edges of the dielectric resonance block and chamfers/cut corners beside edges of the cavity, or comprises tap wires or/sheets disposed on non-parallel planes in the cavity;

each of the cut corners is in a shape of a triangular prism or cuboid or a sector; after corner cutting, under a condition of maintaining frequency, a side length of the dielectric resonance block increases, and a Q-value decreases slightly;

a depth of each of the cut corners or a hole is of a through or partial cut corner/partial hole structure according to a required coupling quantity;

the size of each of the cut corners/chamfers/holes affects a magnitude of a coupling quantity;

coupling screws are disposed on coupling tuning structures in directions perpendicular or parallel to the cut corners; the coupling screw is made of metal; or the coupling screw is made of metal, a surface of which is electroplated with copper or sliver; or the coupling screw is made of medium; or the coupling screw is made of medium, a surface of which is metallized;

and the coupling screw is in a shape of any one of a metal rod, a dielectric rod, a metal disk, a dielectric disk, a metal rod with a metal disk, and a metal rod with a dielectric disk, a dielectric rod with a metal disk, and a dielectric rod with a dielectric disk.

31. The filter comprising the high-Q triple-mode dielectric resonance structure as claimed in claim 22, wherein, the cavity high-Q triple-mode dielectric resonance structure is internally provided with at least two coupling devices for changing orthogonal properties of the electromagnetic field of the degenerate triple-mode in the cavity and are not in parallel arrangement:

each of the at least two coupling device comprises holes/grooves disposed on end surfaces of the dielectric resonance block, center lines of the holes or the grooves are parallel to edges perpendicular to the end surfaces with the holes or the grooves of the dielectric resonance block;

or comprises chambers/cut corners disposed at inner corners of the cavity, or comprises holes/grooves disposed on an end surfaces of the dielectric resonance block and the chambers/cut corners disposed besides edges of the cavity, or comprises tap wires or/sheets disposed on non-parallel planes in the cavity;

a depth of each of the holes is of a through or /partial hole structure according to a required coupling quantity;

the size of each of the holes affects a magnitude of a coupling quantity;

each of the holes/grooves is circular, rectangular or polygonal; after the holes/grooves are formed, under a condition of maintaining frequency, a side length of the dielectric resonance block increases, and a Q-value slightly decreases;

coupling screws are disposed on coupling tuning structures in directions parallel to the holes; the coupling screw is made of metal; or the coupling screw is made of metal, a surface of which is electroplated with copper or sliver; or the coupling screw is made of medium; or the coupling screw is made of medium, a surface of which is the metallized;

and the coupling screw is in a shape of any one of a metal rod, a dielectric rod, a metal disk, a dielectric disk, a metal rod with a metal disk, and a metal rod with a dielectric disk, a dielectric rod with a metal disk, and a dielectric rod with a dielectric disk.

32. The filter comprising the high-Q triple-mode dielectric resonance structure as claimed in claim 22, wherein, the cavity is cube-like; in order to realize coupling among triple modes, cut sides for realizing the coupling among the triple modes are processed on any two adjacent surfaces of the cavity under a premise that the size of the dielectric resonance block is not changed; sizes of the cut sides are related to a required coupling quantity; coupling between the two modes in the triple-mode coupling is realized by the cut sides of the cavity; a remaining coupling is realized by cutting corners at two adjacent sides of the cavity: a wall is not broken when the corners are cut at the adjacent sides of the cavity; corner cutting surfaces need to be completely sealed with the cavity; a surface of the cavity is electroplated with copper or silver; the cavity is made of metal or nonmetal materials; and when the cavity is made of the nonmental materials, an inner wall of the cavity is electroplated with conductive materials.

33. The filter comprising the hiqh-Q triple-mode dielectric resonance structure as claimed in claim 22, wherein, when the cavity is cube-like, the dielectric resonance block and the dielectric support frame are disposed in any one of axial directions of the cavity, and a center of the dielectric resonance block coincides with or approaches a center of the cavity.

34. The filter comprising the high-Q triple-mode dielectric resonance structure as claimed in claim 22, wherein, the dielectric constant of the dielectric support frame is similar to a dielectric constant of air; the dielectric support frame has no effect on the triple-mode resonance frequency; the dielectric support frame supports any single surface of the dielectric resonance block, or supports six surfaces, or different two surfaces, three surfaces, four surfaces and five surfaces in different combinations; each surface is supported by single dielectric support frame or a plurality of dielectric support frames; and one or a plurality of dielectric support frames are disposed on different surfaces according to the needs.

35. The filter comprising the high-Q triple-mode dielectric resonance structure as claimed in claim 22, wherein, the dielectric constant of the dielectric support frame is greater than the dielectric constant of air and is less than the dielectric constant of the dielectric resonance block; in order to maintain a frequency of the original triple-mode, a size of the dielectric support frame corresponding to the axial direction of the dielectric resonance block is slightly reduced; the dielectric support frame supports any single surface of the dielectric resonance block, or supports six surfaces, or different two surfaces, three surfaces, four surfaces and five surfaces in different combinations; the surface without the support frame, of the dielectric resonance block is air; an air surface is arbitrarily combined with the dielectric support frame; each surface is supported by a single dielectric support frame or a plurality of dielectric support frames, or composite dielectric constant support frames comprising a plurality of layers of different dielectric constant dielectric materials; the single-layer and multiple-layer dielectric material support frames are arbitrarily combined with a cube-like dielectric block; one or a plurality of support frames is disposed on different surfaces according to the needs; and in order to maintain a frequency and Q-value of the triple-mode, the size of the dielectric support frame corresponding to the axial direction of the dielectric resonance block is slightly reduced.

36. The filter comprising the high-Q triple-mode dielectric resonance structure as claimed in claim 22, wherein, a surface area of the dielectric support frame is less than or equal to a surface area of the dielectric resonance block; the dielectric support frame is a cylinder, a cube or a cuboid;

the dielectric support frame is of a solid structure or a hollow structure; the dielectric support frame being of the hollow structure comprises a single hole or a plurality of holes; each of the single hole or the plurality of holes is round, square, polygonal and arc;

the dielectric support frame is made of plastic, ceramic, or dielectric; or the dielectric support frame is air.

37. The filter comprising the high-Q triple-mode dielectric resonance structure as claimed in claim 22, wherein, the dielectric support frame is connected with the dielectric resonance block by a manner of crimping, bonding or sintering; and the dielectric support frame and the inner wall of the cavity body are connected by fixing manners such as bonding, crimping, welding, sintering and bolts.

38. The filter comprising the high-Q triple-mode dielectric resonance structure as claimed in claim 22, wherein, a radio frequency channel formed by coupling of radio frequency signals in directions of axes X, Y and Z of triple-mode causes loss and generates heat; and the dielectric resonance block is fully connected with the inner wall of the cavity through the dielectric support frame to guide heat into a cavity body for heat dissipation.

39. The filter comprising the high-Q triple-mode dielectric resonance structure as claimed in claim 22, wherein, a frequency temperature coefficient of the dielectric resonance block is controlled by adjusting a ratio of dielectric materials, and is compensated according to a frequency deviation change of the filter under different temperature conditions.

40. The filter comprising the high-Q triple-mode dielectric resonance structure as claimed in claim 39, wherein, the dielectric resonance block has a single dielectric constant or a composite dielectric constant; the dielectric resonance block with the composite dielectric constant is made of at least two materials with different dielectric constants; materials with different dielectric constants are combined by up and down, or left and right, or asymmetric or nested manners; when materials with different dielectric constants are nested in the dielectric resonance block, one layer of or a plurality of layers of materials with different dielectric constants are nested in the dielectric resonance block; the dielectric resonance block with the composite dielectric constant needs to meet a change variation rules of Q-value conversion points; when side cutting coupling is performed among triple modes of the dielectric resonance block, in order to maintain a required frequency, corresponding side lengths of two surfaces adjacent to cut sides are adjusted in parallel; the dielectric resonance block is made of ceramic or dielectric materials; and a surface of the dielectric resonance block is added with dielectric sheets with different thicknesses and different dielectric constants.

* * * * *